US012767751B2

(12) United States Patent
Tamai et al.

(10) Patent No.: US 12,767,751 B2
(45) Date of Patent: Oct. 20, 2026

(54) METHOD FOR PRODUCING AQUEOUS DISPERSION LIQUID OF FLUORINE-CONTAINING ELASTOMER, FLUORINE-CONTAINING ELASTOMER AND AQUEOUS DISPERSION LIQUID

(71) Applicant: DAIKIN INDUSTRIES, LTD., Osaka (JP)

(72) Inventors: Rina Tamai, Osaka (JP); Tatsuya Morikawa, Osaka (JP); Sota Yuasa, Osaka (JP); Kouhei Takemura, Osaka (JP); Masaki Irie, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 869 days.

(21) Appl. No.: 18/160,129

(22) Filed: Jan. 26, 2023

(65) Prior Publication Data

US 2023/0167219 A1 Jun. 1, 2023

Related U.S. Application Data

(63) Continuation of application No. PCT/JP2021/028117, filed on Jul. 29, 2021.

(30) Foreign Application Priority Data

Jul. 30, 2020 (JP) ................................ 2020-129506

(51) Int. Cl.
*C08F 291/06* (2006.01)
*C08K 5/02* (2006.01)

(52) U.S. Cl.
CPC .............. *C08F 291/06* (2013.01); *C08K 5/02* (2013.01)

(58) Field of Classification Search
None
See application file for complete search history.

(56) References Cited

U.S. PATENT DOCUMENTS

| | | | | |
|---|---|---|---|---|
| 5,474,854 A * | 12/1995 | Kagami | C08J 5/18 525/445 |
| 5,804,650 A | 9/1998 | Tsuda et al. | |
| 6,861,466 B2 * | 3/2005 | Dadalas | C08L 27/18 526/248 |
| 12,187,859 B2 * | 1/2025 | Yoneda | C08J 3/03 |
| 2007/0208131 A1 | 9/2007 | Tsuda et al. | |
| 2008/0114118 A1 | 5/2008 | Tsuda et al. | |
| 2009/0227727 A1 | 9/2009 | Tsuda et al. | |
| 2009/0234086 A1 | 9/2009 | Kishine et al. | |
| 2010/0105825 A1 | 4/2010 | Sugiyama et al. | |
| 2010/0113665 A1 | 5/2010 | Hirono et al. | |
| 2012/0129982 A1 | 5/2012 | Zipplies et al. | |
| 2018/0162967 A1 * | 6/2018 | Gilmore | C07C 15/50 |
| 2021/0009732 A1 | 1/2021 | Higuchi et al. | |
| 2021/0108008 A1 | 4/2021 | Kato et al. | |
| 2023/0101829 A1 | 3/2023 | Kato et al. | |

FOREIGN PATENT DOCUMENTS

| | | |
|---|---|---|
| CN | 1938336 A | 3/2007 |
| CN | 1938337 A | 3/2007 |
| CN | 101687938 A | 3/2010 |
| EP | 4 194 474 A1 | 6/2023 |
| JP | 8-67795 A | 3/1996 |
| JP | 2009-242553 A | 10/2009 |
| JP | 2013-501100 A | 1/2013 |
| JP | 2018-118415 A | 8/2018 |
| WO | 2008/001895 A1 | 1/2008 |
| WO | 2009/008512 A1 | 1/2009 |
| WO | 2009/008514 A1 | 1/2009 |
| WO | 2018/181904 A1 | 10/2018 |
| WO | 2019/208707 A1 | 10/2019 |

OTHER PUBLICATIONS

International Search Report for PCT/JP2021/028117 dated Oct. 19, 2021.
International Preliminary Report on Patentability with translation of Written Opinion dated Jan. 31, 2023 from the International Bureau in International Application No. PCT/JP2021/028117.
Extended European Search Report dated Aug. 2, 2024 from the European Patent Office in Application No. 21849164.5.

* cited by examiner

*Primary Examiner* — Robert S Jones, Jr.
*Assistant Examiner* — Christiaan Roelofse
(74) *Attorney, Agent, or Firm* — Sughrue Mion, PLLC

(57) ABSTRACT

Provided is a method for producing an aqueous dispersion of a fluorine-containing elastomer, comprising polymerizing a fluorine-containing monomer in the presence of a compound (1) having a triple bond and a hydrophilic group and an aqueous medium to produce an aqueous dispersion of a fluorine-containing elastomer.

18 Claims, No Drawings

METHOD FOR PRODUCING AQUEOUS DISPERSION LIQUID OF FLUORINE-CONTAINING ELASTOMER, FLUORINE-CONTAINING ELASTOMER AND AQUEOUS DISPERSION LIQUID

CROSS-REFERENCE TO RELATED APPLICATIONS

This application is a Rule 53 (b) Continuation of International Application No. PCT/JP2021/028117 filed Jul. 29, 2021, which claims priority based on Japanese Patent Application No. 2020-129506 filed Jul. 30, 2020, the respective disclosures of which are incorporated herein by reference in their entirety.

TECHNICAL FIELD

The present disclosure relates to a method for producing an aqueous dispersion of a fluorine-containing elastomer, a fluorine-containing elastomer, and an aqueous dispersion.

BACKGROUND ART

Patent Document 1 discloses a method for producing a fluorine-containing elastomer, comprising carrying out an emulsion polymerization of a fluorine-containing monomer by adding a water-soluble radical polymerization initiator, wherein the emulsion polymerization is carried out in the presence of a compound (1) having a functional group capable of reaction by radical polymerization and a hydrophilic group and a fluorine-containing compound (2) having a hydrophilic group and a fluorocarbon group in which 1 to 6 carbon atoms having a directly bonded fluorine atom are continuously bonded.

CITATION LIST

Patent Documents

Patent Document 1: International Publication No. WO 2008/001895

SUMMARY

The present disclosure provides a method for producing an aqueous dispersion of a fluorine-containing elastomer, comprising polymerizing a fluorine-containing monomer in the presence of a compound (1) having a triple bond and a hydrophilic group and an aqueous medium to produce an aqueous dispersion of a fluorine-containing elastomer:

EFFECTS

The present disclosure can provide a method for producing an aqueous dispersion of a fluorine-containing elastomer, the method being capable of producing a sufficient number of fluorine-containing elastomer particles at a sufficient polymerization rate while suppressing adhesion of the fluorine-containing elastomer to a polymerization tank.

DESCRIPTION OF EMBODIMENTS

Before describing specific embodiments of the present disclosure, some terms used herein are defined or explained.

Herein, the fluorine-containing elastomer is an amorphous fluoropolymer. Being "amorphous" means that the size of a melting peak (ΔH) appearing in differential scanning calorimetry (DSC)(temperature-increasing rate 10° C./min) or differential thermal analysis (DTA) (temperature-increasing rate 10° C./min) of the fluoropolymer is 4.5 J/g or less. The fluorine-containing elastomer exhibits elastomeric characteristics by being crosslinked. Elastomeric characteristics mean such characteristics that the polymer can be stretched, and retain its original length when the force required to stretch the polymer is no longer applied.

Herein, the perfluoromonomer is a monomer that does not contain a carbon atom-hydrogen atom bond within the molecule. In addition to carbon atoms and fluorine atoms, the perfluoromonomer may be a monomer in which some fluorine atoms bonded to carbon atoms are replaced with chlorine atoms, or may be a monomer having a nitrogen atom, an oxygen atom, a sulfur atom, a phosphorus atom, a boron atom, or a silicon atom in addition to carbon atoms. The perfluoromonomer is preferably a monomer in which all hydrogen atoms are replaced with fluorine atoms. The perfluoromonomer does not include a monomer that provides a crosslinkable group.

The monomer that provides a crosslinking site is a monomer (a cure site monomer) that provides a fluoropolymer with a crosslinking site for forming a crosslink by a crosslinking agent. The monomer that provides a crosslinking site includes a monomer that provides a crosslinkable group.

Herein, the contents of the respective monomer units constituting the fluorine-containing elastomer can be calculated by a suitable combination of NMR, FT-IR, elemental analysis, and X-ray fluorescence analysis in accordance with the types of the monomers.

Herein, the term "organic group" means a group containing one or more carbon atoms or a group formed by removing one hydrogen atom from an organic compound.

Examples of the "organic group" include:

an alkyl group optionally having one or more substituents, an alkenyl group optionally having one or more substituents, an alkynyl group optionally having one or more substituents, a cycloalkyl group optionally having one or more substituents, a cycloalkenyl group optionally having one or more substituents, a cycloalkadienyl group optionally having one or more substituents, an aryl group optionally having one or more substituents, an aralkyl group optionally having one or more substituents, a non-aromatic heterocyclic group optionally having one or more substituents, a heteroaryl group optionally having one or more substituents, a cyano group, a formyl group, RaO—, RaCO—, $RaSO_2$—, RaCOO—, RaNRaCO—, RaCONRa—, RaOCO—, $RaOSO_2$—, and $RaNRbSO_2$— wherein each Ra is independently an alkyl group optionally having one or more substituents, an alkenyl group optionally having one or more substituents, an alkynyl group optionally having one or more substituents, a cycloalkyl group optionally having one or more substituents, a cycloalkenyl group optionally having one or more substituents, a cycloalkadienyl group optionally having one or more substituents, an aryl group optionally having one or more substituents, an aralkyl group optionally having one or more substituents, a non-aromatic heterocyclic group optionally having one or more substituents, or a heteroaryl group optionally having one or more substituents, and Rb is independently H or an alkyl group optionally having one or more substituents.

The organic group is preferably an alkyl group optionally having one or more substituents.

The term "substituent" as used herein means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxy amino group, a carbamoylamino group, a sulfamoylamino group, a halogen atom, a sulfamoylcarbamoyl group, a carbamoyl sulfamoyl group, a dialiphatic oxyphosphinyl group, and a diaromatic oxyphosphinyl group.

The aliphatic group may be saturated or unsaturated, and may have a hydroxyl group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8 and preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms and preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12 and preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8 and preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12 and preferably 2 to 8 carbon atoms in total and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8 and preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, and preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total and preferably 1 to 4 carbon atoms in total, such as a methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like.

Examples of the acylamino group include acylamino groups having 2 to 12 carbon atoms in total and preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, the aromatic sulfonamide group, and the heterocyclic sulfonamide group may be, for example, a methanesulfonamide group, a benzenesulfonamide group, and a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8 and preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group may have an aliphatic group, an aliphatic oxy group, a halogen atom, a carbamoyl group, a heterocyclic group having a ring condensed with the aryl group, or an aliphatic oxycarbonyl group, and preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples include alkylthio groups having 1 to 8 carbon atoms in total and more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group, or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, and preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

A range indicated by endpoints as used herein includes all numerical values within the range (for example, the range of 1 to 10 includes 1.4, 1.9, 2.33, 5.75, 9.98, and the like).

The phrase "at least one" as used herein includes all numerical values greater than or equal to 1 (for example, at least 2, at least 4, at least 6, at least 8, at least 10, at least 25, at least 50, at least 100, and the like).

Hereinafter, specific embodiments of the present disclosure will now be described in detail, but the present disclosure is not limited to the following embodiments.

In the production method of the present disclosure, a fluorine-containing monomer is polymerized in the presence of a compound (1) having a triple bond and a hydrophilic group and an aqueous medium to produce an aqueous dispersion of a fluorine-containing elastomer.

As a conventional method for producing an aqueous dispersion of a fluorine-containing elastomer, for example, as described in Patent Document 1, a production method using a fluorine-containing compound having fluorocarbon groups, such as $F(CF_2)_5COONH_4$, and hydrophilic groups is known. However, from various viewpoints, there is a demand for a production method that can smoothly progress polymerization by using a fluorine-free compound without using such a fluorine-containing compound.

The production method of the present disclosure is a method for producing an aqueous dispersion of a fluorine-containing elastomer using a compound (1) having a triple bond and a hydrophilic group and thus is capable of producing a sufficient number of fluorine-containing elastomer particles at a sufficient polymerization rate while suppressing adhesion of the fluorine-containing elastomer to a polymerization tank.

The compound (1) is a compound having one or more triple bonds and one or more hydrophilic groups within the molecule.

The triple bond is preferably a carbon-carbon triple bond. The number of triple bonds in the compound (1) is preferably 1 to 3, more preferably 1 to 2, and even more preferably 1.

Herein, a hydrophilic group is a group that shows affinity for an aqueous medium. Examples of the hydrophilic group include anionic hydrophilic groups, cationic hydrophilic groups, and nonionic hydrophilic groups. For example, the compound (1) may solely contain an anionic hydrophilic group or may solely contain a nonionic hydrophilic group. The compound (1) is preferably a compound (1) having a triple bond and an anionic hydrophilic group.

The hydrophilic group is preferably an anionic hydrophilic group, more preferably —COOM, $—SO_3M$, $—OSO_3M$, $—B(OM)(OR^2)$, $—OB(OM)(OR^2)$, $—PO(OM)(OR^2)$, or $—OPO(OM)(OR^2)$, and even more preferably —COOM because an even greater number of fluorine-containing elastomer particles can be produced at a higher polymerization rate while further suppressing adhesion of the fluorine-containing elastomer to a polymerization tank. M is H, a metal atom, $NR^3_4$, optionally substituted imidazolium, optionally substituted pyridinium, or optionally substituted phosphonium. $R^3$ is the same or different at each occurrence, and is H or an organic group. $R^2$ is H, a metal atom, $NR^3_4$, optionally substituted imidazolium, optionally substituted pyridinium, optionally substituted phosphonium, or an alkynyl group.

M is preferably H, a metal atom, or $NR^3_4$, more preferably H, an alkali metal (Group 1), an alkaline earth metal (Group 2), or $NR^3_4$, even more preferably H, Na, K, Li, or $NH_4$, and particularly preferably H, Na, K, or $NH_4$.

The number of hydrophilic groups in the compound (1) is preferably 1 to 3, more preferably 1 or 2, and even more preferably 1.

The number of carbon atoms in the compound (1) is preferably 2 to 25, more preferably 2 to 10, even more preferably 2 to 6, and particularly preferably 2 to 4 because an even greater number of fluorine-containing elastomer particles can be produced at a higher polymerization rate while further suppressing adhesion of the fluorine-containing elastomer to a polymerization tank. Herein, the number of carbon atoms in the compound (1) does not include the number of carbon atoms of a carboxylic acid group and a carboxylic acid salt group that may be contained in the compound (1).

The compound (1) is preferably a fluorine-free compound.

In the production method of the present disclosure, one or two or more compounds (1) may be used. As the compound (1), a compound having an anionic hydrophilic group may be used singly, a compound having a nonionic hydrophilic group may be used singly, or a compound containing an anionic hydrophilic group and a compound containing a nonionic hydrophilic group may be used in combination.

The compound (1) is preferably a compound (1) represented by general formula (1):

$A^1$-$R^1$—C≡C$X^1$ General formula (1):

wherein $A^1$ is —COOM, —$SO_3$M, —$OSO_3$M, —B(OM)($OR^2$), —OB(OM)($OR^2$), —PO(OM)($OR^2$), or —OPO(OM)($OR^2$); M is H, a metal atom, $NR^3_4$, optionally substituted imidazolium, optionally substituted pyridinium, or optionally substituted phosphonium; $R^3$ is the same or different at each occurrence and is H or an organic group; $R^2$ is H, a metal atom, $NR^3_4$, optionally substituted imidazolium, optionally substituted pyridinium, optionally substituted phosphonium, or an alkynyl group; $R^1$ is single bond or a divalent hydrocarbon group optionally having a halogen atom; and $X^1$ is H, $A^1$, or a hydrocarbon group optionally having a halogen atom, an ether bond, an ester bond, or an amide bond.

In general formula (1), $A^1$ is —COOM, —$SO_3$M, —$OSO_3$M, —B(OM)($OR^2$), —OB(OM)($OR^2$), —PO(OM)($OR^2$), or —OPO(OM)($OR^2$). Here, M is H, a metal atom, $NR^3_4$, optionally substituted imidazolium, optionally substituted pyridinium, or optionally substituted phosphonium; $R^3$ is the same or different at each occurrence and is H or an organic group; $R^2$ is H, a metal atom, $NR^3_4$, optionally substituted imidazolium, optionally substituted pyridinium, optionally substituted phosphonium, or an alkynyl group.

$A^1$ is preferably —COOM because an even greater number of fluorine-containing elastomer particles can be produced at a higher polymerization rate while further suppressing adhesion of the fluorine-containing elastomer to a polymerization tank.

M in $A^1$ is preferably H, a metal atom, or $NR^3_4$, more preferably H, an alkali metal (Group 1), an alkaline earth metal (Group 2), or $NR^3_4$, even more preferably H, Na, K, Li, or $NH_4$, and particularly preferably H, Na, K, or $NH_4$ because an even greater number of fluorine-containing elastomer particles can be produced at a higher polymerization rate while further suppressing adhesion of the fluorine-containing elastomer to a polymerization tank.

The alkynyl group of $R^2$ is preferably a fluorine-free alkynyl group. The alkynyl group of $R^2$ is preferably an ethynyl group optionally substituted with an alkyl group having 1 to 5 carbon atoms, and is more preferably an unsubstituted ethynyl group.

$R^2$ is preferably H, a metal atom, or $NR^3_4$, more preferably H, an alkali metal (Group 1), an alkaline earth metal (Group 2), or $NR^3_4$, even more preferably H, Na, K, Li, or $NH_4$, particularly preferably H, Na, K, or $NH_4$, and most preferably H.

It is also a preferable embodiment that $R^2$ is an ethynyl group when $A^1$ is —PO(OM)($OR^2$) or —OPO(OM)($OR^2$).

In general formula (1), $R^1$ is single bond or a divalent hydrocarbon group optionally having a halogen atom.

Examples of the divalent hydrocarbon group of $R^1$ in general formula (1) include a linear or branched alkanediyl group, a linear or branched alkenediyl group, a linear or branched alkadienediyl group, or a cycloalkanediyl group.

The halogen atom that $R^1$ may contain is preferably F, Cl, Br, or I, and more preferably Cl, Br, or I.

$R^1$ is preferably a single bond or a linear or branched alkanediyl group having 1 to 5 carbon atoms and optionally having a halogen atom, more preferably a single bond, a methylene group, or an ethylene group, even more preferably a single bond or a methylene group, and particularly preferably a single bond because an even greater number of fluorine-containing elastomer particles can be produced at a higher polymerization rate while further suppressing adhesion of the fluorine-containing elastomer to a polymerization tank.

The number of carbon atoms in $R^1$ is preferably 0 to 20, more preferably 0 to 10, even more preferably 0 to 5, and particularly preferably 0 to 3.

In general formula (1), $X^1$ is H, $A^1$, or a hydrocarbon group optionally having a halogen atom, an ether bond, an ester bond, or an amide bond. Here, $A^1$ is as described above.

Examples of the hydrocarbon group of $X^1$ include an alkyl group optionally having an aromatic group or a cycloalkyl group, an alkenyl group optionally having an aromatic group or a cycloalkyl group, a cycloalkyl group optionally having an aromatic group, and an aromatic group optionally having an alkyl group. The alkyl group of $X^1$ and the alkenyl group of $X^1$ are linear or branched. The cycloalkyl group of $X^1$ and the aromatic group optionally having an alkyl group of $X^1$ are monocyclic or polycyclic.

The halogen atom that $X^1$ may contain is preferably F, Cl, Br, or I, and more preferably Cl, Br, or I.

The number of carbon atoms in $X^1$ is preferably 1 to 20, more preferably 1 to 10, even more preferably 1 to 5, and particularly preferably 1 to 3.

$X^1$ is preferably H, an alkyl group having 1 to 5 carbon atoms and optionally having a halogen atom, or $A^1$, more preferably H or $A^1$, even more preferably H, —$SO_3$M, or —COOM, and particularly preferably H or —COOM because an even greater number of fluorine-containing elastomer particles can be produced at a higher polymerization rate while further suppressing adhesion of the fluorine-containing elastomer to a polymerization tank.

When $X^1$ is $A^1$, or that is to say, when $X^1$ is —COOM, —$SO_3$M, —$OSO_3$M, —$B(OM)_2$, —$OB(OM)_2$, —$PO(OM)_2$, or —$OPO(OM)_2$, M is preferably H, a metal atom, or $NR^3_4$, more preferably H, an alkali metal (Group 1), an alkaline earth metal (Group 2), or $NR^3_4$, even more preferably H, Na, K, Li, or $NH_4$, particularly preferably H, Na, K, or $NH_4$, and most preferably H.

Examples of the compound (1) include compounds (1-1) represented by general formula (1-1):

$A^1$-$R^1$—C≡C-$A^1$ General formula (1-1):

wherein $R^1$ and $A^1$ are as described above and may be the same or different at each occurrence.

The compound (1-1) contains two $A^1$, $A^1$ contains one M, and thus the compound (1-1) contains two M. The compound (1-1) is preferably a compound in which only one of two M is H.

More specific examples of the compound (1-1) include compounds represented by the following general formulae:

$MOOC—R^1—C≡C—COOM$ $MO_3S—R^1—C≡C—SO_3M$ $MO_3SO—R^1—C≡C—OSO_3M$ $(R^2O)(MO)B—R^1—C≡B(OM)(OR^2)$ $(R^2O)(MO)BO—R'—C≡C—OB(OM)(OR^2)$ $(R^2O)(MO)OP—R'—C≡C—PO(OM)(OR^2)$ $(R^2O)(MO)OPO—R'—C≡C—OPO(OM)(OR^2)$ wherein $R^1$, M, and $R^2$ are as defined above and may be the same or different at each occurrence.

In particular, the compound (1-1) is preferably a compound represented by general formula:

$MOOC—R^1—C≡C—COOM$ wherein $R^1$ and M are as defined above and may be the same or different at each occurrence.

Examples of the compound (1) include compounds (1-2) represented by general formula (1-2):

$A^1-R^1—C≡C—R^4$ General formula (1-2):

wherein $A^1$ and $R^1$ are as described above, and $R^4$ is H or a hydrocarbon group optionally having a halogen atom, an ether bond, an ester bond, or an amide bond.

In general formula (1-2), $R^4$ is H or a hydrocarbon group optionally having a halogen atom, an ether bond, an ester bond, or an amide bond.

Examples of the hydrocarbon group of $R^4$ include an alkyl group optionally having an aromatic group or a cycloalkyl group, an alkenyl group optionally having an aromatic group or a cycloalkyl group, a cycloalkyl group optionally having an aromatic group, and an aromatic group optionally having an alkyl group. The alkyl group of $R^4$ and the alkenyl group of $R^4$ are linear or branched. The cycloalkyl group of $R^4$ and the aromatic group optionally having an alkyl group of $R^4$ are monocyclic or polycyclic.

The halogen atom that the hydrocarbon group of $R^4$ may contain is preferably F, Cl, Br, or I, and more preferably Cl, Br, or I.

The number of carbon atoms in the hydrocarbon group of $R^4$ is preferably 1 to 20, more preferably 1 to 10, even more preferably 1 to 5, and particularly preferably 1 to 3.

$R^4$ is preferably H or an alkyl group having 1 to 20 carbon atoms, more preferably H or an alkyl group having 1 to 10 carbon atoms, even more preferably H or an alkyl group having 1 to 5 carbon atoms, particularly preferably H or an alkyl group having 1 to 3 carbon atoms, and most preferably H because an even greater number of fluorine-containing elastomer particles can be produced at a higher polymerization rate while further suppressing adhesion of the fluorine-containing elastomer to a polymerization tank.

In particular, the compound (1-2) is preferably a compound represented by general formula:

$MOOC—R^1—C≡C—R^4$ wherein $R^1$, $R^4$, and M are as defined above and may be the same or different at each occurrence.

Examples of the compound (1) include:
acetylenesulfonic acid,
propiolic acid,
ethynyl hydrogen sulfate,
undec-10-ynyl hydrogen sulfate,
but-3-ynyl hydrogen sulfate,
prop-2-ynyl hydrogen sulfate,
pent-4-ynyl hydrogen sulfate,
5-methyl-1-hexyn-3-yl hydrogen sulfate,
ethynylboronic acid,
ethynyl dihydrogen phosphate,
diethynyl hydrogen phosphate,
acetylenedisulfonic acid,
acetylenedicarboxylic acid,
1-propynylsulfonic acid,
2-phenyl-1-ethynylsulfonic acid,
hex-1-yn-1-sulfonic acid,
hexadec-1-yn-1-sulfonic acid,
3,3-dimethyl-1-butinsulfonic acid,
2-cyclopropyl-1-ethynesulfonic acid,
3-methoxy-1-propynylsulfonic acid,
3-phenoxy-1-propynylsulfonic acid,
hept-2-ynoic acid,
6-phenylhex-2-ynoic acid,
3-cyclopropyl-2-propanoic acid,
cyclohexylpropiolic acid,
3-cyclopentyl-2-propynoic acid,
but-2-ynoic acid,
undeca-2,4-dien-6-ynoic acid,
3-(cyclohepta-2,4,6-trien-1-yl)propanoic acid,
6-(fluoren-9-yl)hex-2-ynoic acid,
6-cyclohexyl-hex-2-ynoic acid,
pent-3-ynoic acid,
4-phenyl-3-butynoic acid,
4-(4-methylphenyl)-3-butynoic acid,
4-p-chlorphenyl-3-butynoic acid,
4-p-bromphenyl-3-butynoic acid,
4-(4-fluorophenyl)-3-butynoic acid,
4-[4-(trifluoromethyl)phenyl]-3-butynoic acid,
4-(3-methylphenyl)-3-butynoic acid,
3-cyclopropyl-1-(1-carboxycyclopropyl)-1-propynoic acid,
4-(2-naphthalenyl)-3-butynoic acid,
4-cyclohexyl-3-propynoic acid,
5-phenylpent-1-ynoxyboronic acid,
but-3-en-1-ynoxyboronic acid,
2-phenylethynoxyboronic acid,
2-phenylethynyl phosphate, and
salts thereof.

The compound (1) is more preferably propiolic acid, acetylenedicarboxylic acid, or a salt thereof (such as an ammonium salt, a sodium salt, or a potassium salt) because an even greater number of fluorine-containing elastomer particles can be produced at a higher polymerization rate while further suppressing adhesion of the fluorine-containing elastomer to a polymerization tank.

The compound (1) has a functional group capable of reaction by radical polymerization, and it is thus conjectured that when used in the above polymerization, the compound (1) reacts with a fluorine-containing monomer at the initial stage of the polymerization reaction to form highly stable particles having a hydrophilic group derived from the compound (1). Therefore, it is considered that when polymerization is carried out in the presence of the compound (1), the number of particles of the fluorine-containing elastomer produced during polymerization is increased.

The amount of the compound (1) when polymerizing the fluorine-containing monomer is preferably 3 to 5,000 mass ppm, more preferably 5 mass ppm or more, even more preferably 10 mass ppm or more, particularly preferably 20 mass ppm or more, and most preferably 30 mass ppm or more, and is more preferably 1,000 mass ppm or less, even more preferably 500 mass ppm or less, particularly preferably 300 mass ppm or less, and most preferably 200 mass ppm or less, based on the aqueous medium. By regulating the amount of the compound (1) when polymerizing the fluorine-containing monomer to the above range, an even greater number of fluorine-containing elastomer particles can be produced at a higher polymerization rate while further suppressing adhesion of the fluorine-containing elastomer to a polymerization tank.

Herein, the amount of the compound (1) is the amount of the compound (1) added to the polymerization system. Accordingly, the amount of the compound (1) can be different from the amount of the compound (1) present in the polymerization system. For example, when the compound (1) is incorporated into a fluorine-containing elastomer chain by being copolymerized with the fluorine-containing monomer, the amount of the compound (1) is the total amount of the compound (1) present in the polymerization system without being incorporated into the fluorine-containing elastomer chain and the compound (1) incorporated into the fluorine-containing elastomer chain.

The amount of the compound (1) is also preferably regulated according to the type of the polymerization initiator used in the polymerization and the polymerization temperature.

When using a non-redox polymerization initiator as the polymerization initiator and performing the polymerization at 40 to 70° C., the amount of the compound (1) is preferably 3 to 300 mass ppm, more preferably 3 to 150 mass ppm, even more preferably 5 to 100 mass ppm, and most preferably 8 to 80 mass ppm based on the aqueous medium.

When using a non-redox polymerization initiator as the polymerization initiator and performing the polymerization at higher than 70° C. and 98° C. or lower, the amount of the compound (1) is preferably 3 to 500 mass ppm, more preferably 5 to 300 mass ppm, even more preferably 8 to 200 mass ppm, and most preferably 10 to 180 mass ppm based on the aqueous medium.

When using a redox polymerization initiator as the polymerization initiator and performing the polymerization at 10° C. or higher and lower than 40° C., the amount of the compound (1) is preferably 3 to 300 mass ppm, more preferably 3 to 100 mass ppm, even more preferably 5 to 80 mass ppm, and most preferably 10 to 70 mass ppm based on the aqueous medium.

When using a redox polymerization initiator as the polymerization initiator and performing the polymerization at 40 to 70° C., the amount of the compound (1) is preferably 3 to 500 mass ppm, more preferably 5 to 300 mass ppm, even more preferably 10 to 200 mass ppm, and most preferably 15 to 150 mass ppm based on the aqueous medium.

When using a redox polymerization initiator as the polymerization initiator and performing the polymerization at higher than 70° C. and 98° C. or lower, the amount of the compound (1) is preferably 5 to 500 mass ppm, more preferably 8 to 300 mass ppm, even more preferably 15 to 200 mass ppm, and most preferably 20 to 150 mass ppm based on the aqueous medium.

By regulating the amount of the compound (1) when polymerizing the fluorine-containing monomer to the above range, an even greater number of fluorine-containing elastomer particles can be produced at a higher polymerization rate while further suppressing adhesion of the fluorine-containing elastomer to a polymerization tank.

In the production method of the present disclosure, the polymerization of the fluorine-containing monomer can be carried out by, for example, introducing the compound (1) and an aqueous medium into a pressure-tight polymerization tank equipped with a stirrer, deoxygenating the polymerization tank, then introducing the monomer, heating the polymerization tank to a predetermined temperature, and adding the polymerization initiator to initiate the reaction. Since the pressure decreases as the reaction progresses, an additional monomer is continuously or intermittently fed to maintain the initial pressure, the feeding is stopped when a predetermined amount of the monomer is fed, the monomer in the reaction container is purged, and the temperature is returned to room temperature to terminate the reaction.

In the production method of the present disclosure, when to add the compound (1) is not limited, and the compound (1) may be added at any time during the polymerization reaction, and the compound (1) may also be added such that the compound (1) and the polymerization initiator are concomitantly present.

In the production method of the present disclosure, the compound (1) is preferably present in the polymerization system before the solid concentration of the polymer (the fluorine-containing elastomer) produced by the polymerization reaches preferably 1.0 mass %, more preferably before the solid concentration reaches 0.8 mass %, even more preferably before the solid concentration reaches 0.5 mass %, particularly preferably before the solid concentration reaches 0.1 mass %, and most preferably before the solid concentration reaches 0 mass %. By adding the compound (1) to the polymerization system before the polymer is produced by the polymerization or when the amount of the polymer produced by the polymerization is small, an even greater number of fluorine-containing elastomer particles can be produced at a higher polymerization rate while further suppressing adhesion of the fluorine-containing elastomer to a polymerization tank. The solid concentration is the concentration of the polymer (the fluorine-containing elastomer) based on the total amount of the aqueous medium and the polymer.

The most preferable time to add the compound (1) in the production method of the present disclosure is before the solid concentration of the polymer (the fluorine-containing elastomer) produced by the polymerization reaches 0 mass % because the polymerization reaction can be readily controlled. That is to say, in the production method of the present disclosure, the compound (1) is preferably present before the polymerization initiator is present in the polymerization system to initiate the polymerization reaction.

In the production method of the present disclosure, even when the compound (1) is added to the polymerization system before the polymer is produced by the polymerization or when the amount of the polymer produced by the polymerization is small, the compound (1) may be further added to the polymerization system thereafter. By further adding the compound (1), a high polymerization rate can be maintained while further suppressing adhesion of the fluorine-containing elastomer to a polymerization tank. When further adding the compound (1), the total amount (the amount added) of the compound (1) is preferably regulated so as to be within the range of the above-described suitable amount of the compound (1).

The aqueous medium means a liquid containing water. The aqueous medium is not limited as long as it contains water, and may be a medium that contains water and, for example, a fluorine-free organic solvent such as alcohol, ether, or ketone and/or a fluorine-containing organic solvent having a boiling point of 40° C. or lower.

In the production method of the present disclosure, the fluorine-containing monomer is preferably polymerized also in the presence of a polymerization initiator in addition to the compound (1) and the aqueous medium. In the production method of the present disclosure, after the compound (1) is added to the polymerization system, polymerization of the fluorine-containing monomer can be initiated by adding a polymerization initiator. By polymerizing the fluorine-containing monomer, with the compound (1) and the polymerization initiator being concomitantly present instead of using a homopolymer of the compound (1), an even greater number of fluorine-containing elastomer particles can be produced at a higher polymerization rate while further suppressing adhesion of the fluorine-containing elastomer to a polymerization tank.

The polymerization initiator may be a radical polymerization initiator. The polymerization initiator is not limited as long as it can produce radicals at the temperature of polymerizing the fluorine-containing monomer, and an oil-soluble polymerization initiator, a water-soluble polymerization initiator, and the like can be used while a water-soluble polymerization initiator is preferable. The polymerization initiator may be combined with a reducing agent or the like to be used as a redox initiator.

The amount of the polymerization initiator when polymerizing the fluorine-containing monomer is suitably determined according to the type of the monomer, the molecular weight of the intended fluorine-containing elastomer, and the reaction rate. The amount of the polymerization initiator is suitably determined according to the molecular weight of the intended fluorine-containing elastomer and the polymerization reaction rate, and is preferably 0.00001 to 10 mass % and more preferably 0.0001 to 1 mass % based on 100 mass % of the total amount of the monomer.

The polymerization initiator may be an oil-soluble radical polymerization initiator, a water-soluble radical polymerization initiator, or an azo compound.

The oil-soluble radical polymerization initiator may be a known oil-soluble peroxide, and representative examples include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl) peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotoriacontafluorodocosanoyl)peroxide.

Examples of the azo compound include azodicarboxylate, azodicarboxyl diamide, 2,2'-azobisisobutyronitrile, 2,2'-azobis(2,4-dimethylvaleronitrile), 2,2'-azobis(2-methylpropionamidine) dihydrochloride, and 4,4'-azobis(4-cyanovaleric acid).

The water-soluble radical polymerization initiator may be a known water-soluble peroxide, and examples include ammonium salts, potassium salts, and sodium salts of persulfuric acid, perboric acid, perchloric acid, perphosphoric acid, percarbonic acid, and the like, organic peroxides such as disuccinic acid peroxide and diglutaric acid peroxide, t-butyl permaleate, and t-butyl hydroperoxide. A reducing agent such as sulfite may be contained together, and the amount thereof may be 0.1 to 20 times the amount of the peroxide.

The water-soluble peroxide is preferably a salt of persulfuric acid because the amount of radicals to be produced can be easily regulated, and potassium persulfate ($K_2S_2O_8$), ammonium persulfate ($(NH_4)_2S_2O_8$), and sodium persulfate ($Na_2S_2O_8$) are preferable, and ammonium persulfate is most preferable.

When carrying out the polymerization using a water-soluble peroxide at a polymerization temperature of 45° C. or higher, the polymerization is preferably carried out without using a reducing agent.

For example, when carrying out the polymerization at a low temperature of 60° C. or lower, the polymerization initiator to be used is preferably a redox initiator obtained by combining an oxidizing agent and a reducing agent. That is to say, the polymerization is preferably carried out in the presence of a redox initiator.

Examples of the oxidizing agent include persulfates, organic peroxides, potassium permanganate, manganese triacetate, ammonium cerium nitrate, and bromates. Examples of the reducing agent include sulfites, bisulfites, bromates, diimine, oxalic acid, and sulfinic acid metal salts. Examples of persulfates include ammonium persulfate, potassium persulfate, and sodium persulfate. Examples of sulfites include sodium sulfite and ammonium sulfite. To increase the decomposition rate of the initiator, preferably a copper salt or an iron salt is also added to the combination of the redox initiator. The copper salt may be copper(II) sulfate, and the iron salt may be iron(II) sulfate. When a copper salt or an iron salt is used, a chelating agent is added particularly preferably. The chelating agent is preferably disodium ethylenediaminetetraacetate dihydrate.

Examples of the redox initiator include potassium permanganate/oxalic acid, ammonium persulfate/a bisulfurous acid salt/iron(II) sulfate, ammonium persulfate/a sulfurous acid salt/iron (II) sulfate, ammonium persulfate/a sulfurous acid salt, ammonium persulfate/iron(II) sulfate, manganese triacetate/oxalic acid, cerium ammonium nitrate/oxalic acid, a bromic acid salt/a sulfurous acid salt, a bromic acid salt/a bisulfurous acid salt, and ammonium persulfate/sodium hydroxymethanesulfinate dihydrate, and ammonium persulfate/sodium hydroxymethanesulfinate dihydrate is preferable.

When using a redox initiator, one of an oxidizing agent and a reducing agent may be introduced into a polymerization tank in advance, and then the other may be added continuously or intermittently to initiate the polymerization. For example, when using ammonium persulfate/sodium hydroxymethanesulfinate dihydrate, preferably ammonium persulfate is introduced into a polymerization tank, and then sodium hydroxymethanesulfinate dihydrate is continuously added thereto.

The amount of persulfate used in the redox initiator is preferably 0.001 to 2.0 mass %, more preferably 0.01 to 1.5 mass %, and particularly preferably 0.05 to 1.0 mass % based on the aqueous medium used in the polymerization.

The amount of the reducing agent used is preferably 1 to 30 mass %, more preferably 3 to 25 mass %, and particularly preferably 5 to 20 mass % based on the aqueous medium used in the polymerization.

The amount of the third component (such as the above copper salt or iron salt) used is preferably 0.001 to 0.5 mass %, more preferably 0.005 to 0.4 mass %, and particularly preferably 0.01 to 0.3 mass % based on the aqueous medium used in the polymerization.

In the production method of the present disclosure, the fluorine-containing monomer may be polymerized also in the presence of a chain transfer agent. The chain transfer agent may be a known chain transfer agent, and, for example, hydrocarbon, ester, ether, alcohol, ketone, a halogen-containing compound, carbonate, and the like are usable. In particular, isopentane, diethyl malonate, and ethyl acetate are preferable from the viewpoint that the reaction rate is unlikely impaired, and diiodine compounds such as $I(CF_2)_4I$, $I(CF_2)_6I$, and $ICH_2I$ are preferable from the viewpoint that the polymer terminal can be iodinated, and such a compound can be used as a reactive polymer.

The chain transfer agent used is particularly preferably a bromine compound or an iodine compound. The polymerization method involving a bromine compound or an iodine compound is, for example, iodine transfer polymerization or bromine transfer polymerization.

The iodine compound and the bromine compound are water-insoluble and are unlikely emulsified. Accordingly, their use is conventionally limited in emulsion polymerization, and there is a tendency that a large amount of a surfactant has to be used. According to the production method of the present disclosure, the fluorine-containing elastomer can be obtained by polymerization involving an iodine compound or a bromine compound, such as iodine transfer polymerization or bromine transfer polymerization, even in the absence of a conventionally used surfactant.

Iodine transfer polymerization refers to a method involving living radical polymerization by a radical chain reactivation mechanism, which is radically active due to a low carbon-iodine bond dissociation energy and occurs due to the involvement of a chain transfer reaction during the course of a radical polymerization reaction. Known reaction conditions can be suitably used, and, for example, the reaction conditions described in, but are not limited to, "KOBUNSHI RONBUNSHU (Japanese Journal of Polymer Science and Technology), Vol. 49, No. 10, pp. 765-783, October 1992", Japanese Patent Laid-Open No. 53-3495, and the like can be suitably adopted. Similar polymerization can be carried out by using a bromine compound in place of an iodine compound, and such polymerization is referred to as bromine transfer polymerization herein.

Among these, iodine transfer polymerization is preferable in terms of polymerization reactivity, crosslinking reactivity, and the like.

Representative examples of the bromine compound and the iodine compound include compounds represented by the following general formula:

$$R^8I_xBr_y$$

wherein x and y are each independently an integer of 0 to 2 and satisfy $1 \leq x+y \leq 2$, and $R^8$ is a saturated or unsaturated fluorohydrocarbon group or chlorofluorohydrocarbon group having 1 to 16 carbon atoms, or a hydrocarbon group having 1 to 3 carbon atoms, and may contain an oxygen atom. Iodine or bromine is introduced into a polymer by using a bromine compound or an iodine compound, and functions as a crosslinking point.

Examples of the bromine compound and the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, CFBrClCFClBr, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodomonobromo-substituted product, a diiodomonobromo-substituted product, and a (2-iodoethyl) and (2-bromoethyl)-substituted product of benzene, and one of these compounds may be used singly, or these compounds can also be mutually combined and used.

Among these, in terms of polymerization reactivity, crosslinking reactivity, availability, and the like, compounds that do not contain bromine and solely contain iodine are preferable, and 1,4-diiodoperfluorobutane, 1,6-diiodoperfluorohexane, or 2-iodoperfluoropropane is preferably used.

The amount of the chain transfer agent is preferably $0.2 \times 10^{-3}$ to 2 mol % and preferably $1.0 \times 10^{-3}$ to 1 mol % based on the total amount of the monomer used in the polymerization.

In one embodiment of the production method of the present disclosure, a fluorine-containing monomer (provided that the compound (1) and the fluorine-containing compound (A) are excluded) is polymerized. Examples of the fluorine-containing monomer include fluorine-containing monomers such as vinylidene fluoride (VdF), tetrafluoroethylene (TFE), hexafluoropropylene (HFP), perfluoro (alkyl vinyl ether)(PAVE), chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing vinyl fluoride ether, and fluorine-containing monomers (2) represented by general formula (2):

$$CHX^1{=}CX^2Rf \qquad (2)$$

wherein one of $X^1$ and $X^2$ is H, the other is F, and Rf is a linear or branched fluoroalkyl group having 1 to 12 carbon atoms.

PAVE is more preferably perfluoro(methyl vinyl ether) (PMVE), perfluoro(ethyl vinyl ether)(PEVE), or perfluoro (propyl vinyl ether)(PPVE), and particularly preferably PMVE.

PAVE may be perfluorovinyl ether represented by the formula: $CF_2{=}CFOCF_2ORf^c$ wherein $Rf^c$ is a linear or branched perfluoroalkyl group having 1 to 6 carbon atoms, a cyclic perfluoroalkyl group having 5 to 6 carbon atoms, or a linear or branched perfluorooxyalkyl group having 1 to 3 oxygen atoms and 2 to 6 carbon atoms. PAVE is preferably, for example, $CF_2{=}CFOCF_2OCF_3$, $CF_2{=}CFOCF_2OCF_2CF_3$, or $CF_2{=}CFOCF_2OCF_2CF_2OCF_3$.

The fluorine-containing monomer (2) is preferably a monomer in which Rf is a linear fluoroalkyl group, and is more preferably a monomer in which Rf is a linear perfluoroalkyl group. Rf preferably has 1 to 6 carbon atoms.

Examples of the fluorine-containing monomer (2) include $CH_2$=$CFCF_3$, $CH_2$=$CFCF_2CF_3$, $CH_2$=$CFCF_2CF_2CF_3$, $CH_2$=$CFCF_2CF_2CF_2CF_3$, CHF=$CHCF_3$ (1,3,3,3-tetrafluoropropene), CHF=$CHCF_3$ (E form), and CHF=$CHCF_3$ (Z form), and, in particular, 2,3,3,3-tetrafluoropropylene represented by $CH_2$=$CFCF_3$ is preferable.

In the production method of the present disclosure, at least vinylidene fluoride or tetrafluoroethylene is preferably polymerized as the fluorine-containing monomer, and vinylidene fluoride is more preferably polymerized, because a greater number of fluorine-containing elastomer particles can be produced at a higher polymerization rate while further suppressing adhesion of the fluorine-containing elastomer to a polymerization tank.

In the production method of the present disclosure, a fluorine-free monomer may be polymerized together with the fluorine-containing monomer (provided that the compound (1) is excluded). Examples of the fluorine-free monomer include α-olefin monomers having 2 to 10 carbon atoms, such as ethylene, propylene, butene, and pentene, and alkyl vinyl ethers having an alkyl group having 1 to 20 carbon atoms, such as methyl vinyl ether, ethyl vinyl ether, propyl vinyl ether, cyclohexyl vinyl ether, hydroxybutyl vinyl ether, and butyl vinyl ether, and one or a combination of two or more of these monomers and compounds can be used.

The production method of the present disclosure is capable of producing an aqueous dispersion containing a fluorine-containing elastomer. The fluorine-containing elastomer is preferably a partially fluorinated elastomer because polymerization of the fluorine-containing monomer proceeds more smoothly, and an even greater number of fluorine-containing elastomer particles can be produced at a higher polymerization rate while further suppressing adhesion of the fluorine-containing elastomer to a polymerization tank. The partially fluorinated elastomer is a fluoropolymer that contains a fluorine-containing monomer unit, in which the content of a perfluoromonomer unit is less than 90 mol % based on all polymerization units, and that has a glass transition temperature of 20° C. or lower and a melting peak (ΔH) size of 4.5 J/g or less.

The fluorine-containing elastomer preferably contains a methylene group (—$CH_2$—) in the main chain. The fluorine-containing elastomer containing —$CH_2$— in the main chain is not limited as long as it contains a chemical structure represented by —$CH_2$—, examples include fluorine-containing elastomers containing a structure such as —$CH_2$—$CF_2$—, —$CH_2$—$CH(CH_3)$—, —$CH_2$—$CH_2$—, or —$CH_2CF_2(CF_3)$—, and these can be introduced into the main chain of a fluorine-containing elastomer by polymerizing, for example, vinylidene fluoride, propylene, ethylene, and 2,3,3,3-tetrafluoropropylene.

The fluorine-containing elastomer preferably contains a structural unit derived from at least one monomer selected from the group consisting of, for example, tetrafluoroethylene (TFE), vinylidene fluoride (VdF), and a perfluoroethylenically unsaturated compound (such as hexafluoropropylene (HFP) or perfluoro(alkyl vinyl ether)(PAVE)) represented by the general formula: $CF_2$=CF—$Rf^a$ wherein $Rf^a$ is —$CF_3$ or —$ORf^b$ ($Rf^b$ is a perfluoroalkyl group having 1 to 5 carbon atoms). The fluorine-containing elastomer preferably contains a VdF unit or a TFE unit in particular.

More specific examples of the fluorine-containing elastomer include a VdF-based fluorine-containing elastomer, a TFE/propylene (Pr)-based fluorine-containing elastomer, a TFE/Pr/VdF-based fluorine-containing elastomer, an ethylene (Et)/HFP-based fluorine-containing elastomer, an Et/HFP/VdF-based fluorine-containing elastomer, an Et/HFP/TFE-based fluorine-containing elastomer, and an Et/TFE/PAVE-based fluorine-containing elastomer. Among these, a VdF-based fluorine-containing elastomer, a TFE/Pr-based fluorine-containing elastomer, a TFE/Pr/VdF-based fluorine-containing elastomer, and an Et/TFE/PAVE-based fluorine-containing elastomer are more suitable in terms of good heat aging resistance and oil resistance.

The VdF-based fluorine-containing elastomer is a fluorine-containing elastomer having a VdF unit. The VdF-based fluorine-containing elastomer preferably has a VdF unit that accounts for 20 mol % or more and 90 mol % or less, more preferably 40 mol % or more and 85 mol or less, even more preferably 45 mol % or more and 80 mol % or less, and particularly preferably 50 mol % or more and 80 mol % or less of the total number of moles of the VdF unit and the monomer unit derived from further monomers.

Further monomers in the VdF-based fluorine-containing elastomer are not limited as long as they are monomers that are copolymerizable with VdF, and, for example, the above-described fluorine-containing monomers are usable.

The VdF-based fluorine-containing elastomer is preferably at least one copolymer selected from the group consisting of a VdF/HFP copolymer, a VdF/TFE/HFP copolymer, a VdF/CTFE copolymer, a VdF/CTFE/TFE copolymer, a VdF/PAVE copolymer, a VdF/TFE/PAVE copolymer, a VdF/HFP/PAVE copolymer, a VdF/HFP/TFE/PAVE copolymer, a VdF/TFE/Pr copolymer, a VdF/Et/HFP copolymer, and a copolymer of VdF/fluorine-containing monomer (2). Further monomers other than VdF more preferably have at least one monomer selected from the group consisting of TFE, HFP, and PAVE.

Among these VdF-based fluorine-containing elastomers, at least one copolymer selected from the group consisting of a VdF/HFP copolymer, a VdF/TFE/HFP copolymer, a copolymer of VdF/fluorine-containing monomer (2), a VdF/PAVE copolymer, a VdF/TFE/PAVE copolymer, a VdF/HFP/PAVE copolymer, and a VdF/HFP/TFE/PAVE copolymer is preferable, and at least one copolymer selected from the group consisting of a VdF/HFP copolymer, a VdF/HFP/TFE copolymer, a copolymer of VdF/fluorine-containing monomer (2), and a VdF/PAVE copolymer is more preferable.

The VdF/PAVE copolymer preferably has a VdF/PAVE composition of (65 to 90)/(35 to 10)(mol %).

In one preferable form, the VdF/PAVE composition is (50 to 78)/(50 to 22)(mol %).

The VdF/TFE/PAVE copolymer preferably has a VdF/TFE/PAVE composition of (40 to 80)/(3 to 40)/(15 to 35)(mol %).

The VdF/HFP/PAVE copolymer preferably has a VdF/HFP/PAVE composition of (65 to 90)/(3 to 25)/(3 to 25)(mol %).

The VdF/HFP/TFE/PAVE copolymer preferably has a VdF/HFP/TFE/PAVE composition of (40 to 90)/(0 to 25)/(0 to 40)/(3 to 35)(mol %), and more preferably (40 to 80)/(3 to 25)/(3 to 40)/(3 to 25)(mol %).

As for the copolymer of VdF/fluorine-containing monomer (2), preferably the VdF/fluorine-containing monomer (2) unit is (85 to 20)/(15 to 80)(mol %) and the unit of further monomers other than VdF and the fluorine-containing monomer (2) is 0 to 50 mol % of all monomer units, and the mol % ratio of the VdF/fluorine-containing monomer (2) unit is more preferably (80 to 20)/(20 to 80). It is also one of the preferable forms that the composition of the VdF/fluorine-containing monomer (2) unit is (78 to 50)/(22 to 50)(mol %).

The copolymer of VdF/fluorine-containing monomer (2) in which the VdF/fluorine-containing monomer (2) unit is (85 to 50)/(15 to 50)(mol %), and the unit of further monomers other than VdF and the fluorine-containing monomer (2) is 1 to 50 mol % of all monomer units, is also preferable. Further monomers other than VdF and the fluorine-containing monomer (2) are preferably monomers exemplified as further monomers with respect to the VdF-based fluorine-containing elastomer, such as TFE, HFP, PMVE, perfluoroethyl vinyl ether (PEVE), PPVE, CTFE, trifluoroethylene, hexafluoroisobutene, vinyl fluoride, Et, Pr, alkyl vinyl ether, and a monomer that provides a crosslinkable group, and, in particular, PMVE, CTFE, HFP, and TFE are more preferable.

The TFE/Pr-based fluorine-containing elastomer refers to a fluorine-containing copolymer composed of 45 to 70 mol % TFE and 55 to 30 mol % Pr. In addition to these two components, a specific third component may be contained.

The specific third component contained may be, for example, a fluorine-containing monomer such as fluorine-containing olefin other than TFE (such as VdF, HFP, CTFE, or perfluoro(butylethylene)), fluorine-containing vinyl ether (perfluoro(propyl vinyl ether), or perfluoro(methyl vinyl ether)); or a hydrocarbon-based monomer such as α-olefin (such as ethylene or 1-butene), vinyl ether (such as ethyl vinyl ether, butyl vinyl ether, or hydroxybutyl vinyl ether), or vinyl ester (such as vinyl acetate, vinyl benzoate, vinyl crotonate, or vinyl methacrylate). As for the specific third component, one or a combination of two or more may be used.

The TFE/Pr-based fluorine-containing elastomer preferably contains VdF, and as for the TFE/Pr-based fluorine-containing elastomer, an elastomer composed of TFE, Pr, and VdF is referred to as a TFE/Pr/VdF-based fluorine-containing elastomer.

The TFE/Pr/VdF-based fluorine-containing elastomer may further contain the above specific third component other than VdF. As for the specific third component, one or a combination of two or more may be used. The total content of the third component in the TFE/Pr-based fluorine-containing elastomer is preferably 35 mol % or less, more preferably 33 mol % or less, and even more preferably 31 mol % or less.

The Et/HFP copolymer preferably has an Et/HFP composition of (35 to 80)/(65 to 20)(mol %), and more preferably (40 to 75)/(60 to 25)(mol %).

The Et/HFP/TFE copolymer preferably has an Et/HFP/TFE composition of (35 to 75)/(25 to 50)/(0 to 15) (mol %), and more preferably (45 to 75)/(25 to 45)/(0 to 10)(mol %).

The Et/TFE/PAVE copolymer preferably has an Et/TFE/PAVE composition of (10 to 40)/(32 to 60)/(20 to 40)(mol %), and more preferably (20 to 40)/(40 to 50)/(20 to 30)(mol %). PAVE is preferably PMVE.

The fluorine-containing elastomer is preferably a fluorine-containing elastomer containing a VdF unit and more preferably a VdF/HFP copolymer or a VdF/HFP/TFE copolymer, and a fluorine-containing elastomer having a VdF/HFP/TFE composition of (32 to 85)/(10 to 34)/(0 to 40)(mol %) is particularly preferable. The VdF/HFP/TFE composition is more preferably (32 to 85)/(15 to 34)/(0 to 34)(mol %), even more preferably (47 to 81)/(17 to 32)/(0 to 26)(mol %), particularly preferably (47 to 79)/(17 to 32)/(0 to 26) (mol %), and most preferably (47 to 78)/(17 to 32)/(0 to 26)(mol %).

For example, the VdF/HFP copolymer preferably has a VdF/HFP composition of (45 to 85)/(15 to 55)(mol %), more preferably (50 to 83)/(17 to 50)(mol %), even more preferably (55 to 81)/(19 to 45)(mol %), yet more preferably (60 to 80)/(20 to 40)(mol %), particularly preferably (60 to 79)/(21 to 40)(mol %), and most preferably (60 to 78)/(22 to 40)(mol %).

The above-described configuration is the configuration of the main monomers of the fluorine-containing elastomer, and a monomer that provides a crosslinkable group may be copolymerized in addition to the main monomers. The monomer that provides a crosslinkable group is a monomer capable of introducing into the fluorine-containing elastomer a crosslinkable group suitable according to the production method and the crosslinking system, and examples include known polymerizable compounds containing a crosslinkable group such as an iodine atom, a bromine atom, a carbon-carbon double bond, a cyano group, a carboxyl group, a hydroxyl group, an amino group, or an ester group.

Preferable examples of the monomer that provides a crosslinkable group include compounds represented by general formula (3):

$$CY^1_2{=}CY^2R_f^2X^1 \quad (3)$$

wherein $Y^1$ and $Y^2$ are each independently a fluorine atom, a hydrogen atom, or —$CH_3$; $R_f^2$ is a linear or branched fluorine-containing alkylene group that may have one or more ether-bonding oxygen atoms, that may have an aromatic ring, and in which some or all hydrogen atoms are replaced with fluorine atoms; and $X^1$ is an iodine atom or a bromine atom.

Specific examples of the monomer that provides a crosslinkable group include iodine or bromine-containing monomers represented by general formula (4):

$$CY^1_2{=}CY^2R_f^3CHR^1{-}X^1 \quad (4)$$

(wherein, $Y^1$, $Y^2$, and $X^1$ are as described above; $R_f^3$ is a linear or branched fluorine-containing alkylene group that may have one or more ether-bonding oxygen atoms and in which some or all hydrogen atoms are replaced with fluorine atoms, or that is to say, a linear or branched fluorine-containing alkylene group in which some or all hydrogen atoms are replaced with fluorine atoms, a linear or branched fluorine-containing oxyalkylene group in which some or all hydrogen atoms are replaced with fluorine atoms, or a linear or branched fluorine-containing polyoxyalkylene group in which some or all hydrogen atoms are replaced with fluorine atoms; and $R^1$ is a hydrogen atom or a methyl group), and iodine or bromine-containing monomers represented by general formulae (5) to (22):

$$CY^4_2{=}CY^4(CF_2)_n{-}X^1 \quad (5)$$

(wherein $Y^4$ is the same or different and is a hydrogen atom or a fluorine atom, and n is an integer of 1 to 8), $$CF_2{=}CFCF_2R_f^4{-}X^1 \quad (6)$$

(wherein $R^4$ is —$(OCF_2)_n$— or —$(OCF(CF_3))_n$—, and n is an integer of 0 to 5), $$CF_2{=}CFCF_2(OCF(CF_3)CF_2)_m(OCH_2CF_2CF_2)_nOCH_2CF_2{-}X^1 \quad (7)$$

(wherein m is an integer of 0 to 5, and n is an integer of 0 to 5), $CF_2$═$CFCF_2(OCH_2CF_2CF_2)_m(OCF(CF_3)CF_2)_nOCF(CF_3)$—$X^1$ (8)

(wherein m is an integer of 0 to 5, and n is an integer of 0 to 5), $CF_2$═$CF(OCF_2CF(CF_3))_mO(CF_2)_n$—$X^1$ (9)

(wherein m is an integer of 0 to 5, and n is an integer of 1 to 8), $CF_2$═$CF(OCF_2CF(CF_3))_m$—$X^1$ (10)

(wherein m is an integer of 1 to 5), $CF_2$═$CFOCF_2(CF(CF_3)OCF_2)_nCF(—X^1)CF_3$ (11)

(wherein n is an integer of 1 to 4), $CF_2$═$CFO(CF_2)_nOCF(CF_3)$—$X^1$ (12)

(wherein n is an integer of 2 to 5), $CF_2$═$CFO(CF_2)_n$—$(C_6H_4)$—$X^1$ (13)

(wherein n is an integer of 1 to 6), $CF_2$═$CF(OCF_2CF(CF_3))_nOCF_2CF(CF_3)$—$X^1$ (14)

(wherein n is an integer of 1 to 2), $CH_2$═$CFCF_2O(CF(CF_3)CF_2O)_nCF(CF_3)$—$X^1$ (15)

(wherein n is an integer of 0 to 5), $CF_2$═$CFO(CF_2CF(CF_3)O)_m(CF_2)_n$—$X^1$ (16)

(wherein m is an integer of 0 to 5, and n is an integer of 1 to 3), $CH_2$═$CFCF_2OCF(CF_3)OCF(CF_3)$—$X^1$ (17)

$CH_2$═$CFCF_2OCH_2CF_2$—$X^1$ (18)

$CF_2$═$CFO(CF_2CF(CF_3)O)_mCF_2CF(CF_3)$—$X^1$ (19)

(wherein m is an integer of 0 or more), $CF_2$═$CFOCF(CF_3)CF_2O(CF_2)_n$—$X^1$ (20)

(wherein n is an integer of 1 or more), $CF_2$═$CFOCF_2OCF_2CF(CF_3)OCF_2$—$X^1$ (21), and $CH_2$═$CH$—$(CF_2)_nX^1$ (22)

(wherein n is an integer of 2 to 8), (in general formulae (5) to (22), $X^1$ is as described above), and one of these can be used singly, or these can be used in any combination.

The iodine or bromine-containing monomer represented by general formula (4) is preferably iodine-containing fluorinated vinyl ether represented by general formula (23):

(23)

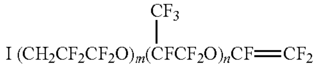

wherein m is an integer of 1 to 5, and n is an integer of 0 to 3, more specifically $I\,CH_2CF_2CF_2OCF$═$CF_2$, $I\,(CH_2CF_2CF_2O)_2\,CF$═$CF_2$, $I\,(CH_2CF_2CF_2O)_3\,CF$═$CF_2$, -continued

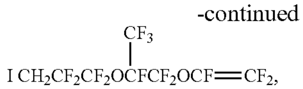

,

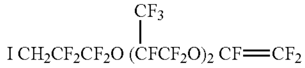

and among these, $ICH_2CF_2CF_2OCF$═$CF_2$ is preferable.

More specifically, the iodine or bromine-containing monomer represented by general formula (5) is preferably $ICF_2CF_2CF$═$CH_2$ or $I(CF_2CF_2)_2CF$═$CH_2$.

More specifically, the iodine or bromine-containing monomer represented by general formula (9) is preferably $I(CF_2CF_2)_2OCF$═$CF_2$.

More specifically, the iodine or bromine-containing monomer represented by general formula (22) is preferably $CH_2$═$CHCF_2CF_2I$ or $I(CF_2CF_2)_2CH$═$CH_2$.

The monomer that provides a crosslinkable group is preferably a bisolefin compound represented by the formula: $R^2R^3C$═$CR^4$—$Z$—$CR^5$═$CR^6R^7$ wherein $R^2$, $R^3$, $R^4$, $R^5$, $R^6$, and $R^7$ are the same or different and are each independently H or an alkyl group having 1 to 5 carbon atoms; and Z is a linear or branched alkylene or cycloalkylene group having 1 to 18 carbon atoms that may contain an oxygen atom and that is preferably at least partially fluorinated, or a (per)fluoropolyoxyalkylene group. Herein, the "(per) fluoropolyoxyalkylene group" means "a fluoropolyoxyalkylene group or a perfluoropolyoxyalkylene group".

Z is preferably a (per)fluoroalkylene group having 4 to 12 carbon atoms, and $R^2$, $R^3$, $R^4$, $R^5$, $R^6$, and $R^7$ are preferably hydrogen atoms.

Z when being a (per)fluoropolyoxyalkylene group is preferably a (per)fluoropolyoxyalkylene group represented by the formula:

$-(Q)_p-CF_2O—(CF_2CF_2O)_m—(CF_2O)_n—CF_2-(Q)_p-$ wherein Q is an alkylene group having 1 to 10 carbon atoms or an oxyalkylene group having 2 to 10 carbon atoms, p is 0 or 1, and m and n are integers such that the m/n ratio is 0.2 to 5 and that the molecular weight of the (per)fluoropolyoxyalkylene group is in a range of 500 to 10,000 and preferably 1,000 to 4,000. In this formula, Q is preferably selected from —$CH_2OCH_2$— and —$CH_2O(CH_2CH_2O)SCH_2$— (s=1 to 3).

Preferable bisolefin is $CH_2$═$CH$—$(CF_2)_2$—$CH$═$CH_2$, $CH_2$═$CH$—$(CF_2)_4$—$CH$═$CH_2$, $CH_2$═$CH$—$(CF_2)_6$—$CH$═$CH_2$, $CH_2$═$CH$—$Z'$—$CH$═$CH_2$ formula:

(wherein $Z^1$ is —$CH_2OCH_2$—$CF_2O$— $(CF_2CF_2O)_m$—$(CF_2O)_n$—$CF_2$—$CH_2OCH_2$— (m/n is 0.5), and the molecular weight is preferably 2,000), and the like.

In particular, 3,3,4,4,5,5,6,6,7,7,8,8-dodecafluoro-1,9-decadiene represented by $CH_2$═$CH$—$(CF_2)_6$—$CH$═$CH_2$ is preferable.

The number average molecular weight Mn of the fluorine-containing elastomer is preferably 1,000 to 1,000,000, more preferably 10,000 to 500,000, and particularly preferably 20,000 to 300,000.

The fluorine content of the fluorine-containing elastomer is preferably 50 mass % or more, more preferably 55 mass % or more, and even more preferably 60 mass % or more. The upper limit of the fluorine content is preferably 75 mass % or less, and more preferably 73 mass % or less. The fluorine content is calculated based on a measured value obtained by $^{19}$F-NMR, $^{1}$H-NMR, elemental analysis, or the like.

The fluorine-containing elastomer preferably has a Mooney viscosity at 100° C. (ML1+10 (100° C.)) of 130 or less. The Mooney viscosity is more preferably 110 or less, and even more preferably 90 or less. The Mooney viscosity is more preferably 10 or more, and even more preferably 20 or more. Here, the Mooney viscosity is a value measured in accordance with JIS K 6300-1.2013.

The fluorine-containing elastomer preferably has a glass transition temperature of −50 to 0° C. The glass transition temperature is more preferably −2° C. or lower, and even more preferably −3° C. or lower. The glass transition temperature is more preferably −45° C. or higher, and even more preferably −40° C. or higher. The glass transition temperature may be −10° C. or higher, and may be −9° C. or higher. Here, the glass transition temperature can be determined by heating 10 mg of a sample at 20° C./min to give a DSC curve using a differential scanning calorimeter (e.g., X-DSC 7000 manufactured by Hitachi High-Tech Science Corporation) and calculating a glass transition temperature from a DSC differential curve in accordance with JIS K 6240:2011.

The fluorine-containing elastomer preferably has an iodine content of 0.05 to 1.0 mass %. The iodine content is more preferably 0.08 mass % or more, and even more preferably 0.10 mass % or more, and is more preferably 0.80 mass % or less, and even more preferably 0.60 mass % or less.

The iodine content can be determined by elemental analysis. Specifically, the iodine content can be measured by mixing 5 mg of $Na_2SO_3$ with 12 mg of the fluorine-containing elastomer, combusting the mixture in oxygen in a quartz flask using an absorbent obtained by dissolving 30 mg of a 1:1 (mass ratio) mixture of $Na_2CO_3$ and $K_2CO_3$ in 20 ml of pure water, leaving the combusted mixture to stand for 30 minutes, and then measuring the iodine content using a Shimadzu 20A ion chromatograph. A calibration curve of a KI standard solution containing 0.5 mass ppm and 1.0 mass ppm of iodine ions can be used.

The fluorine-containing elastomer preferably contains a $-CH_2I$ structure. Whether the $-CH_2I$ structure is contained can be verified by a $^{1}$H-NMR spectrum. The fluorine-containing elastomer containing a $-CH_2I$ structure can be obtained by iodine transfer polymerization.

In the fluorine-containing elastomer, the amount of the $-CH_2I$ structure is preferably 0.05 to 1.50 mol % based on 100 mol % of the $-CH_2-$ structure. The amount of the $-CH_2I$ structure is more preferably 0.08 mol % or more and even more preferably 0.12 mol % or more, and is more preferably 1.20 mol % or less, even more preferably 1.00 mol % or less, and particularly preferably 0.80 mol % or less. The amount of the $-CH_2I$ structure can be determined by a $^{1}$H-NMR spectrum.

The fluorine-containing elastomer more preferably contains a $-CF_2CH_2I$ structure. The fluorine-containing elastomer containing the $-CF_2CH_2I$ structure can be obtained by producing a VdF-based fluorine-containing elastomer by iodine transfer polymerization.

In the fluorine-containing elastomer, the amount of the $-CF_2CH_2I$ structure is preferably 0.05 to 1.50 mol % based on 100 mol % of the $-CH_2-$ structure. The amount of the $-CF_2CH_2I$ structure is more preferably 0.08 mol % or more and even more preferably 0.12 mol % or more, and is more preferably 1.20 mol % or less, even more preferably 1.00 mol % or less, and particularly preferably 0.80 mol % or less. The amount of the $-CF_2CH_2I$ structure is calculated by A/B*100 from integrated value A of all peak intensities observed in a chemical shift region of 3.75 to 4.05 ppm derived from $-CH_2I$ and integrated value B of all peak intensities observed in chemical shift regions of 2.3 to 2.7 ppm and 2.9 to 3.75 ppm derived from $-CH_2-$ in a $^{1}$H-NMR spectrum.

A suitable fluorine-containing monomer for use in the production method of the present disclosure may be the fluorine-containing monomer described with respect to the fluorine-containing elastomer.

In the production method of the present disclosure, the fluorine-containing monomer, moreover, may be polymerized in the presence of the fluorine-containing compound (A) containing a functional group capable of reaction by radical polymerization (provided that the compound (1) is excluded) and a hydrophilic group because an even greater number of fluorine-containing elastomer particles can be produced at a higher polymerization rate while further suppressing adhesion of the fluorine-containing elastomer to a polymerization tank. In the production method of the present disclosure, one or two or more fluorine-containing compounds (A) may be used. In the production method of the present disclosure, the fluorine-containing monomer may be polymerized in the absence of the fluorine-containing compound (A)(provided that the compound (1) is excluded). According to the production method of the present disclosure, a sufficient number of fluorine-containing elastomer particles can be produced at a sufficient polymerization rate while suppressing adhesion of the fluorine-containing elastomer to a polymerization tank, even when the fluorine-containing monomer is polymerized in the absence of the fluorine-containing compound (A).

The fluorine-containing compound (A) is preferably a compound containing an anionic or nonionic hydrophilic group, and more preferably a compound containing an anionic hydrophilic group. For example, the fluorine-containing compound (A) may solely contain an anionic hydrophilic group or may solely contain a nonionic hydrophilic group. The fluorine-containing compound (A) may be a compound solely containing an anionic hydrophilic group, may be a compound solely containing a nonionic hydrophilic group, or may be a combination of a compound containing an anionic hydrophilic group and a compound containing a nonionic hydrophilic group. It is conjectured that due to the fluorine-containing compound (A) having a hydrophilic group, highly stable particles are formed, and, due to high particle formability, the number of particles per unit amount of water is increased, thus resulting in a higher polymerization rate.

Examples of the hydrophilic group in the fluorine-containing compound (A) include $-NH_2$, $-P(O)(OM)_2$, $-OP(O)(OM)_2$, $-SO_3M$, $-OSO_3M$, $-COOM$, $-B(OM)_2$, and $-OB(OM)_2$, wherein M is H, a metal atom, $NR^7_4$, optionally substituted imidazolium, optionally substituted pyridinium, or optionally substituted phosphonium; and $R^7$ is H or an organic group and are the same as or different from one another, and any two are optionally bonded to each other to form a ring. In particular, the hydrophilic group is preferably $-SO_3M$ or $-COOM$, and more preferably $-COOM$. The organic group of $R^7$ is preferably an alkyl group. $R^7$ is preferably H or a $C_{1-10}$ organic group, more preferably H or a $C_{1-4}$ organic group, even more preferably H or a $C_{1-4}$ alkyl group, and most preferably H. When two M are contained in each formula, the two M are the same as or different from each other. Examples of the metal atom include monovalent or divalent metal atoms, an alkali metal (Group 1) or an alkaline earth metal (Group 2) is preferable, and Na, K, or Li is more preferable.

The "functional group capable of reaction by radical polymerization" in the fluorine-containing compound (A) may be a group containing a radically polymerizable unsaturated bond.

The group having a radically polymerizable unsaturated bond is, for example, a group having an ethylenically unsaturated bond, such as a vinyl group or an allyl group. The group having an ethylenically unsaturated bond can be represented by the following formula:

$$CX^eX^g{=}CX^fR{-}$$

wherein $X^e$, $X^f$, and $X^g$ are each independently F, Cl, H, $CF_3$, $CF_2H$, $CFH_2$, or $CH_3$; and R is a linking group. The linking group R may be the linking group $R^a$, which will be described below.

Examples of the group having a radically polymerizable unsaturated bond include $-CH{=}CH_2$, $-CF{=}CH_2$, $-CH{=}CF_2$, $-CF{=}CF_2$, $-CH_2-CH{=}CH_2$, $-CF_2-CF{=}CH_2$, $-CF_2-CF{=}CF_2$, $-(C{=}O)-CH{=}CH_2$, $-(C{=}O)-CF{=}CH_2$, $-(C{=}O)-CH{=}CF_2$, $-(C{=}O)-CF{=}CF_2$, $-(C{=}O)-C(CH_3){=}CH_2$, $-(C{=}O)-C(CF_3){=}CH_2$, $-(C{=}O)-C(CH_3){=}CF_2$, $-(C{=}O)-C(CF_3){=}CF_2$, $-O-CH_2-CH{=}CH_2$, $-O-CF_2-CF{=}CH_2$, $-O-CH_2-CH{=}CF_2$, $-O-CF{=}CF_2$, and $-O-CF_2-CF{=}CF_2$.

The fluorine-containing compound (A) has a functional group capable of reaction by radical polymerization, and it is thus conjectured that when used in the above polymerization, the fluorine-containing compound (A) reacts with the fluorine-containing monomer and the compound (1) at the initial stage of the polymerization reaction to form highly stable particles having a hydrophilic group derived from the compound (1) and the fluorine-containing compound (A). Therefore, it is considered that when polymerization is carried out in the presence of the compound (1) and the fluorine-containing compound (A), the number of particles of the fluorine-containing elastomer produced during polymerization is increased.

In the production method of the present disclosure, the fluorine-containing monomer may be polymerized also in the presence of the fluorine-containing compound (A) represented by general formula (A) because an even greater number of fluorine-containing elastomer particles can be produced at a higher polymerization rate while suppressing adhesion of the fluorine-containing elastomer to a polymerization tank:

$$CX^iX^k{=}CX^jR^a-(CZ^1Z^2)_k-Y^3 \qquad \text{General formula (A):}$$

wherein $X^i$, $X^j$, and $X^k$ are each independently F, Cl, H, or $CF_3$;

$Y^3$ is a hydrophilic group; $R^a$ is a linking group; $Z^1$ and $Z^2$ are each independently H, F, or $CF_3$; and k is 0 or 1; provided that at least one of $X^i$, $X^k$, $X^j$, $R^a$, $Z^1$, and $Z^2$ comprises F; and provided that when k is 0, $R^a$ is a linking group other than single bond.

$Y^3$ in general formula (A) is a hydrophilic group. Because an even greater number of fluorine-containing elastomer particles can be produced at a higher polymerization rate while suppressing adhesion of the fluorine-containing elastomer to a polymerization tank, preferable examples of the hydrophilic group include $-NH_2$, $-P(O)(OM)_2$, $-OP(O)(OM)_2$, $-SO_3M$, $-OSO_3M$, $-COOM$, $-B(OM)_2$, and $-OB(OM)_2$, wherein M is H, a metal atom, $NR^7_4$, optionally substituted imidazolium, optionally substituted pyridinium, or optionally substituted phosphonium; and $R^7$ is H or an organic group and may be the same or different, and any two are optionally bonded to each other to form a ring. In particular, the hydrophilic group is more preferably $-SO_3M$ or $-COOM$, and even more preferably $-COOM$. The organic group of $R^7$ is preferably an alkyl group. $R^7$ is preferably H or a $C_{1-10}$ organic group, more preferably H or a $C_{1-4}$ organic group, even more preferably H or a $C_{1-4}$ alkyl group, and most preferably H. Examples of the metal atom include monovalent or divalent metal atoms, an alkali metal (Group 1) or an alkaline earth metal (Group 2) is preferable, and Na, K, or Li is more preferable.

$R^a$ in general formula (A) is a linking group. The "linking group" as used herein refers to a divalent linking group. The linking group is preferably a single bond or a group containing at least one carbon atom. However, when k is 0, $R^a$ is a linking group other than single bond, and is preferably a group containing at least one carbon atom. The number of carbon atoms of the linking group may be 2 or more, may be 4 or more, may be 8 or more, may be 10 or more, or may be 20 or more. The upper limit of the number of carbon atoms of the linking group is not limited, and, for example, may be 100 or less, and may be 50 or less.

The linking group may be linear or branched, cyclic or acyclic, saturated or unsaturated, and substituted or unsubstituted, and, as desired, may contain one or more heteroatoms selected from the group consisting of sulfur, oxygen, and nitrogen, and, as desired, may contain one or more functional groups selected from the group consisting of ester, amide, sulfonamide, carbonyl, carbonate, urethane, urea, and carbamate. The linking group may be a group that does not contain a carbon atom and that is a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced with halogen other than fluorine, such as chlorine, and may or may not contain a double bond. $R^a$ may be linear or branched, and may be cyclic or acyclic. $R^a$ may contain a functional group (such as ester, ether, ketone, amine, or halide).

$R^a$ may also be a fluorine-free divalent organic group or a partially fluorinated or perfluorinated divalent organic group.

$R^a$ may be, for example, a hydrocarbon group in which no fluorine atom is bonded to a carbon atom, a hydrocarbon group in which some hydrogen atoms bonded to carbon atoms are replaced with fluorine atoms, a hydrocarbon group in which all hydrogen atoms bonded to carbon atoms are replaced with fluorine atoms, $-(C{=}O)-$, $-(C{=}O)-O-$, or a hydrocarbon group containing an ether bond, and these may contain an oxygen atom, may contain a double bond, and may contain a functional group.

$R^a$ is preferably a hydrocarbon group that has 1 to 100 carbon atoms, that may contain $-(C{=}O)-$, $-(C{=}O)-O-$, or an ether bond, and that may contain a carbonyl group, and in the hydrocarbon group, some or all hydrogen atoms bonded to carbon atoms may be replaced with fluorine.

$R^a$ is preferably at least one selected from $-(CH_2)_a-$, $-(CF_2)_a-$, $-O-(CF_2)_a-$, $-(CF_2)_a-O-(CF_2)_b-$, $-O(CF_2)_a-O-(CF_2)_b-$, $-(CF_2)_a-[O-(CF_2)_b]_c-$, $-O(CF_2)_a-[O-(CF_2)_b]_c-$, $-[(CF_2)_a-O]_b-[(CF_2)_c-O]_d-$, $-O[(CF_2)_a-O]_b-[(CF_2)_c-O]_d-$, $-[CF_2CF$ $(CF_3)O]_a$—$(CF_2)_b$—, —(C═O)—, —(C═O)—, —(C═O)—$(CH_2)_a$—, —(C═O)—$(CF_2)_a$—, —(C═O)—O—$(CH_2)_a$—, —(C═O)—O—$(CF_2)_a$—, —(C═O)—$[(CH_2)_a$—$O]_b$—, —(C═O)—$[(CF_2)_a$—$O]_b$—, —(C═O)—O$[(CH_2)_a$—$O]_b$—, —(C═O)—O$[(CF_2)_a$—$O]_b$—, —(C═O)—O$[(CH_2)_a$—$O]_b$—$(CH_2)_c$—, —(C═O)—O$[(CF_2)_a$—$O]_b$—$(CF_2)_c$—, —(C═O)—$(CH_2)_a$—O—$(CH_2)_b$—, —(C═O)—$(CF_2)_a$—O—$(CF_2)_b$—, —(C═O)—O—$(CH_2)_a$—O—$(CH_2)_b$—, —(C═O)—O—$(CF_2)_a$—O—$(CF_2)_b$—, —(C═O)—O—$C_6H_4$—, and a combination thereof.

In the formulae, a, b, c, and d are each independently at least 1 or more. a, b, c, and d may each independently be 2 or more, may be 3 or more, may be 4 or more, may be 10 or more, and may be 20 or more. The upper limit of a, b, c, and d is, for example, 100.

Suitable specific examples of $R^a$ include —$CF_2$—O—, —$CF_2$—O—$CF_2$—, —$CF_2$—O—$CH_2$—, —$CF_2$—O—$CH_2CF_2$—, —$CF_2$—O—$CF_2CF_2$—, —$CF_2$—O—$CF_2CH_2$—, —$CF_2$—O—$CF_2CF_2CH_2$—, —$CF_2$—O—$CF(CF_3)$—, —$CF_2$—O—$CF(CF_3)CF_2$—, —$CF_2$—O—$CF(CF_3)CF_2$—O—, —$CF_2$—O—$CF(CF_3)CH_2$—, —(C═O)—, —(C═O)—O—, —(C═O)—$(CH_2)$—, —(C═O)—$(CF_2)$—, —(C═O)—O—$(CH_2)$—, —(C═O)—O—$(CF_2)$—, —(C═O)—$[(CH_2)_2$—$O]_n$—, —(C═O)—$[(CF_2)_2$—$O]_n$—, —(C═O)—O$[(CH_2)_2$—$O]_n$—, —(C═O)—O$[(CF_2)_2$—$O]_n$—, —(C═O)—O$[(CH_2)_2$—$O]_n$—$(CH_2)$—, —(C═O)—O$[(CF_2)_2$—$O]_n$—$(CF_2)$—, —(C═O)—$(CH_2)_2$—O—$(CH_2)$—, —(C═O)—$(CF_2)_2$—O—$(CF_2)$—, —(C═O)—O—$(CH_2)_2$—O—$(CH_2)$—, —(C═O)—O—$(CF_2)_2$—O—$(CF_2)$—, and —(C═O)—O—$C_6H_4$—. In particular, $R^a$ is preferably —$CF_2$—O—, —$CF_2$—O—$CF_2$—, —$CF_2$—O—$CF_2CF_2$—, —$CF_2$—O—$CF(CF_3)$—, —$CF_2$—O—$CF(CF_3)CF_2$—, —$CF_2$—O—$CF(CF_3)CF_2$—O—, —(C═O)—, —(C═O)—O—, —(C═O)—$(CH_2)$—, —(C═O)—O—$(CH_2)$—, —(C═O)—O$[(CH_2)_2$—$O]_n$—, —(C═O)—O$[(CH_2)_2$—$O]_n$—$(CH_2)$—, —(C═O)—$(CH_2)_2$—O—$(CH_2)$—, or —(C═O)—O—$C_6H_4$—.

In the formulae, n is an integer of 1 to 10.

—$R^a$—$(CZ^1Z^2)_k$ in general formula (A) is preferably —$CF_2$—O—$CF_2$—, —$CF_2$—O—$CF(CF_3)$—, —$CF_2$—O—$C(CF_3)_2$—, —$CF_2$—O—$CF_2$—$CF_2$—, —$CF_2$—O—$CF_2$—$CF(CF_3)$—, —$CF_2$—O—$CF_2$—$C(CF_3)_2$—, —$CF_2$—O—$CF_2CF_2$—$CF_2$—, —$CF_2$—O—$CF_2CF_2$—$CF(CF_3)$—, —$CF_2$—O—$CF_2CF_2$—$C(CF_3)_2$—, —$CF_2$—O—$CF(CF_3)$—$CF_2$—, —$CF_2$—O—$CF(CF_3)$—$CF(CF_3)$—, —$CF_2$—O—$CF(CF_3)$—$C(CF_3)_2$—, —$CF_2$—O—$CF(CF_3)CF_2$—$CF_2$—, —$CF_2$—O—$CF(CF_3)CF_2$—$CF(CF_3)$—, —$CF_2$—O—$CF(CF_3)CF_2$—$C(CF_3)_2$—, —$CF_2$—O—$CF(CF_3)CF_2$—O—$CF_2$—, —$CF_2$—O—$CF(CF_3)$ $CF_2$—O—$CF(CF_3)$—, —$CF_2$—O—$CF(CF_3)CF_2$—O—$C(CF_3)_2$—, —(C═O)—, —(C═O)—O—, —(C═O)—$(CH_2)$—, —(C═O)—$(CF_2)$—, —(C═O)—O—$(CH_2)$—, —(C═O)—O—$(CF_2)$—, —(C═O)—$[(CH_2)_2$—$O]_n$—$(CH_2)$—, —(C═O)—$[(CF_2)_2$—$O]_n$—$(CF_2)$—, —(C═O)—$[(CH_2)_2$—$O]_n$—$(CH_2)$—$(CH_2)$—, —(C═O)—$[(CF_2)_2$—$O]_n$—$(CF_2)$—$(CF_2)$—, —(C═O)—O$[(CH_2)_2$—$O]_n$—$(CF_2)$—, —(C═O)—O$[(CH_2)_2$—$O]_n$—$(CH_2)$—$(CH_2)$—, —(C═O)—0 $[(CF_2)_2$—$O]_n$—$(CF_2)$—, —(C═O)—0 $[(CF_2)_2$—$O]_n$—$(CF_2)$—$(CF_2)$—, —(C═O)—$(CH_2)_2$—O—$(CH_2)$—$(CH_2)$—, —(C═O)—$(CF_2)_2$—O—$(CF_2)$—$(CF_2)$—, —(C═O)—O—$(CH_2)_2$—O—$(CH_2)$—$(CH_2)$—, —(C═O)—O—$(CF_2)_2$—O—$(CF_2)$—$(CF_2)$—, —(C═O)—O—$(CH_2)_2$—O—$(CH_2)$—$C(CF_3)_2$—, —(C═O)—O—$(CF_2)_2$—O—$(CF_2)$—$C(CF_3)_2$—, or —(C═O)—O—$C_6H_4$—$C(CF_3)_2$—, and more preferably —$CF_2$—O—$CF(CF_3)$—, —$CF_2$—O—$CF_2$—$CF(CF_3)$—, —$CF_2$—O—$CF_2CF_2$—$CF(CF_3)$—, —$CF_2$—O—$CF(CF_3)$—$CF(CF_3)$—, —$CF_2$—O—$CF(CF_3)$ $CF_2$—$CF(CF_3)$—, —$CF_2$—O—$CF(CF_3)CF_2$—O—$CF(CF_3)$—, —(C═O)—, —(C═O)—O—$(CH_2)$—, —(C═O)—O—$(CH_2)$—$(CH_2)$—, —(C═O)—O$[(CH_2)_2$—$O]_n$—$(CH_2)$—$(CH_2)$—, —(C═O)—O—$(CH_2)_2$—O—$(CH_2)$—$C(CF_3)_2$—, or —(C═O)—O—$C_6H_4$—$C(CF_3)_2$—.

In the formulae, n is an integer of 1 to 10.

Specific examples of the compound represented by general formula (A) include:

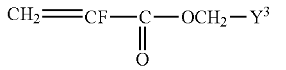

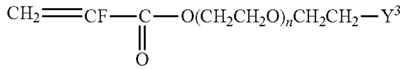

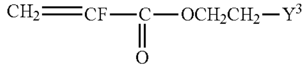

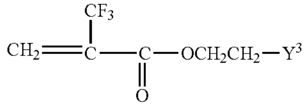

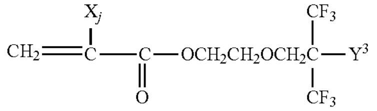

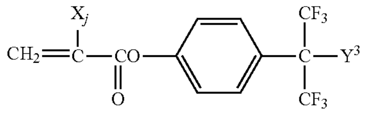

wherein $X^j$ and $Y^3$ are as described above, and n is an integer of 1 to 10.

$R^a$ is preferably a divalent group represented by the following general formula (r1):

—$(C═O)_h$—$(O)_i$—$CF_2$—O—$(CX^6{}_2)_e$—{O—$CF(CF_3)\}_f$—$(O)_g$— (r1)

(wherein $X^6$ is each independently H, F, or $CF_3$, e is an integer of 0 to 3, f is an integer of 0 to 3, g is 0 or 1, h is 0 or 1, and i is 0 or 1), and is also preferably a divalent group represented by the following general formula (r2):

—$(C═O)_h$—$(O)_i$—$CF_2$—O—$(CX^7{}_2)_e$—$(O)_g$— (r2)

(wherein $X^7$ is each independently H, F, or $CF_3$, e is an integer of 0 to 3, g is 0 or 1, h is 0 or 1, and i is 0 or 1).

—$R^a$—$(CZ^1Z^2)_k$— in general formula (A) is also preferably a divalent group represented by the following formula (t1):

—$(C═O)_h$—$(O)_i$—$CF_2$—O—$(CX^6{}_2)_e$—{O—$CF(CF_3)\}_f$—$(O)_g$—$CZ^1Z^2$— (t1)

(wherein $X^6$ is each independently H, F, or $CF_3$, e is an integer of 0 to 3, f is an integer of 0 to 3, g is 0 or 1, h is 0 or 1, i is 0 or 1, and $Z^1$ and $Z^2$ are each independently F or $CF_3$), and, more preferably, in formula (t1), one of $Z^1$ and $Z^2$ is F, and the other is $CF_3$.

In general formula (A), —$R^a$—$(CZ^1Z^2)_k$— is also preferably a divalent group represented by the following formula (t2):

—$(C═O)_h$—$(O)_i$—$CF_2$—O—$(CX^7{}_2)_e$—$(O)_g$—$CZ^1Z^2$— (t2)

(wherein $X^7$ is each independently H, F, or $CF_3$, e is an integer of 0 to 3, g is 0 or 1, h is 0 or 1, i is 0 or 1, and $Z^1$ and $Z^2$ are each independently F or $CF_3$), and, more preferably, in formula (t2), one of $Z^1$ and $Z^2$ is F, and the other is $CF_3$.

It is also preferable that the compound represented by general formula (A) has a C—F bond and does not have a C—H bond in the portion excluding the hydrophilic group ($Y^3$). That is to say, in general formula (A), it is preferable that $X^i$, $X^j$, and $X^k$ are all F, and that $R^a$ is a perfluoroalkylene group having one or more carbon atoms, and the perfluoroalkylene group may be either linear or branched, may be either cyclic or acyclic, and may contain at least one catenary heteroatom. The number of carbon atoms of the perfluoroalkylene group may be 2 to 20, and may be 4 to 18.

The compound represented by general formula (A) may be partially fluorinated. That is to say, it is preferable that the compound represented by general formula (A) has at least one hydrogen atom bonded to a carbon atom and at least one fluorine atom bonded to a carbon atom in the portion excluding the hydrophilic group ($Y^3$).

The compound represented by general formula (A) is also preferably a compound represented by the following formula (Aa):

$$CF_2{=}CF{-}O{-}Rf^0{-}Y^3 \quad \text{(Aa)}$$

wherein $Y^3$ is a hydrophilic group, and $Rf^0$ is a perfluorinated divalent linking group that is perfluorinated, that may be linear or branched, cyclic or acyclic, saturated or unsaturated, and substituted or unsubstituted, and that optionally and additionally contains one or more heteroatoms selected from the group consisting of sulfur, oxygen, and nitrogen.

The compound represented by general formula (A) is also preferably a compound represented by the following formula (Ab):

$$CH_2{=}CH{-}O{-}Rf^0{-}Y^3 \quad \text{(Ab)}$$

wherein $Y^3$ is a hydrophilic group, and $Rf^0$ is a perfluorinated divalent linking group as defined with respect to formula (Aa).

In one preferable form of general formula (A), $Y^3$ is $-OSO_3M$. When $Y^3$ is $-OSO_3M$, examples of the compound represented by general formula (A) include $CF_2{=}CF(OCF_2CF_2CH_2OSO_3M)$, $CH_2{=}CH((CF_2)_4CH_2OSO_3M)$, $CF_2{=}CF(O(CF_2)_4CH_2OSO_3M)$, $CF_2{=}CF(OCF_2CF(CF_3)CH_2OSO_3M)$, $CF_2{=}CF(OCF_2CF(CF_3)OCF_2CF_2CH_2OSO_3M)$, $CH_2{=}CH((CF_2)_4CH_2OSO_3M)$, $CF_2{=}CF(OCF_2CF_2SO_2N(CH_3)CH_2CH_2OSO_3M)$, $CH_2{=}CH(CF_2CF_2CH_2OSO_3M)$, $CF_2{=}CF(OCF_2CF_2CF_2CF_2SO_2N(CH_3)CH_2CH_2OSO_3M)$, and $CH_2{=}CH(CF_2CF_2CH_2OSO_3M)$. In the formulae, M is as described above.

In one preferable form of general formula (A), $Y^3$ is $-SO_3M$. When $Y^3$ is $-SO_3M$, examples of the compound represented by general formula (A) include $CF_2{=}CF(OCF_2CF_2SO_3M)$, $CF_2{=}CF(O(CF_2)_4SO_3M)$, $CF_2{=}CF(OCF_2CF(CF_3)SO_3M)$, $CF_2{=}CF(OCF_2CF(CF_3)OCF_2CF_2SO_3M)$, $CH_2{=}CH(CF_2CF_2SO_3M)$, $CF_2{=}CF(OCF_2CF(CF_3)OCF_2CF_2CF_2CF_2SO_3M)$, $CH_2{=}CH((CF_2)_4SO_3M)$, and $CH_2{=}CH((CF_2)_3SO_3M)$. In the above formulae, M is as described above.

In one preferable form of general formula (A), $Y^3$ is $-COOM$. When $Y^3$ is $-COOM$, examples of the compound represented by general formula (A) include $CF_2{=}CF(OCF_2CF_2COOM)$, $CF_2{=}CF(OCF_2CF_2CF_2COOM)$, $CF_2{=}CF(O(CF_2)_5COOM)$, $CF_2{=}CF(OCF_2CF(CF_3)COOM)$, $CF_2{=}CF(OCF_2CF(CF_3)O(CF_2)_nCOOM)$ (n is greater than 1), $CH_2{=}CH(CF_2CF_2COOM)$, $CH_2{=}CH((CF_2)_4COOM)$, $CH_2{=}CH((CF_2)_3COOM)$, $CF_2{=}CF(OCF_2CF_2SO_2NR'CH_2COOM)$, $CF_2{=}CF(O(CF_2)_4SO_2NR'CH_2COOM)$, $CF_2{=}CF(OCF_2CF(CF_3)SO_2NR'CH_2COOM)$, $CF_2{=}CF(OCF_2CF(CF_3)OCF_2CF_2SO_2NR'CH_2COOM)$, $CH_2{=}CH(CF_2CF_2SO_2NR'CH_2COOM)$, $CF_2{=}CF(OCF_2CF(CF_3)OCF_2CF_2CF_2CF_2SO_2NR'CH_2COOM)$, $CH_2{=}CH((CF_2)_4SO_2NR'CH_2COOM)$, $CH_2{=}CH(CF_2CF_2SO_2NR'CH_2COOM)$, and $CH_2{=}CH((CF_2)_3SO_2NR'CH_2COOM)$. In the above formulae, R' is H or a $C_{1-4}$ alkyl group, and M is as described above.

It is also one preferable form of general formula (A) that $Y^3$ is $-OP(O)(OM)_2$. When $Y^3$ is $-OP(O)(OM)_2$, examples of the compound represented by general formula (A) include $CF_2{=}CF(OCF_2CF_2CH_2OP(O)(OM)_2)$, $CF_2{=}CF(O(CF_2)_4CH_2OP(O)(OM)_2)$, $CF_2{=}CF(OCF_2CF(CF_3)CH_2OP(O)(OM)_2)$, $CF_2{=}CF(OCF_2CF(CF_3)OCF_2CF_2CH_2OP(O)(OM)_2)$, $CF_2{=}CF(OCF_2CF_2SO_2N(CH_3)CH_2CH_2OP(O)(OM)_2)$, $CF_2{=}CF(OCF_2CF_2CF_2CF_2SO_2N(CH_3)CH_2CH_2OP(O)(OM)_2)$, $CH_2{=}CH(CF_2CF_2CH_2OP(O)(OM)_2$, $CH_2{=}CH((CF_2)_4CH_2OP(O)(OM)_2)$, and $CH_2{=}CH((CF_2)_3CH_2OP(O)(OM)_2)$. In the formulae, M is as described above.

It is also one preferable form of general formula (A) that $Y^3$ is $-P(O)(OM)_2$. When $Y^3$ is $-P(O)(OM)_2$, examples of the compound represented by general formula (A) include $CF_2{=}CF(OCF_2CF_2P(O)(OM)_2)$, $CF_2{=}CF(O(CF_2)_4P(O)(OM)_2)$, $CF_2{=}CF(OCF_2CF(CF_3)\ P(O)(OM)_2)$, $CF_2{=}CF(OCF_2CF(CF_3)OCF_2CF_2P(O)(OM)_2)$, $CH_2{=}CH(CF_2CF_2P(O)(OM)_2)$, $CH_2{=}CH((CF_2)_4P(O)(OM)_2)$, and $CH_2{=}CH((CF_2)_3P(O)(OM)_2)$, and in the formulae, M is as described above.

The compound represented by general formula (A) is preferably at least one selected from the group consisting of a compound represented by the following general formula (5):

$$CX_2{=}CY({-}CZ_2{-}O{-}Rf{-}Y^3) \quad (5)$$

(wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having an ether bond and having 2 to 100 carbon atoms, and $Y^3$ is as described above), a compound represented by the following general formula (6):

$$CX_2{=}CY({-}O{-}Rf{-}Y^3) \quad (6)$$

(wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above), and a compound represented by the following general formula (7):

$$CX_2{=}CY({-}Rf{-}Y^3) \quad (7)$$

(wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above).

The fluorine-containing alkylene group having an ether bond and having 2 to 100 carbon atoms is an alkylene group that does not contain a structure having an oxygen atom at a terminal and that contains an ether bond between carbon atoms.

In general formula (5), each X is —H or —F. X may be both —F, or at least one may be —H. For example, one may be —F and the other may be —H, or both may be —H.

In general formula (5), Y is —H, —F, an alkyl group, or a fluorine-containing alkyl group. The alkyl group is an alkyl group that does not contain a fluorine atom, and has one or more carbon atoms. The alkyl group preferably has 6 or less carbon atoms, more preferably 4 or less carbon atoms, and even more preferably 3 or less carbon atoms. The fluorine-containing alkyl group is an alkyl group containing at least one fluorine atom, and has one or more carbon atoms. The fluorine-containing alkyl group preferably has 6 or less carbon atoms, more preferably 4 or less carbon atoms, and even more preferably 3 or less carbon atoms. Y is preferably —H, —F, or —$CF_3$, and more preferably —F.

In general formula (5), Z is the same or different and is —H, —F, an alkyl group, or a fluoroalkyl group. The alkyl group is an alkyl group that does not contain a fluorine atom, and has one or more carbon atoms. The alkyl group preferably has 6 or less carbon atoms, more preferably 4 or less carbon atoms, and even more preferably 3 or less carbon atoms. The fluorine-containing alkyl group is an alkyl group containing at least one fluorine atom, and has one or more carbon atoms. The fluorine-containing alkyl group preferably has 6 or less carbon atoms, more preferably 4 or less carbon atoms, and even more preferably 3 or less carbon atoms. Z is preferably —H, —F, or —$CF_3$, and more preferably —F.

In general formula (5), at least one of X, Y, and Z preferably contains a fluorine atom. For example, X may be —H, and Y and Z may be —F.

In general formula (5), Rf is a fluorine-containing alkylene group having 1 to 40 carbon atoms or a fluorine-containing alkylene group having 2 to 100 carbon atoms and having an ether bond. The fluorine-containing alkylene group preferably has 2 or more carbon atoms. The fluorine-containing alkylene group preferably has 30 or less carbon atoms, more preferably 20 or less carbon atoms, and even more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)$ $CF_2$—, and —$CF(CF_3)CH_2$—. The fluorine-containing alkylene group is preferably a perfluoroalkylene group.

The fluorine-containing alkylene group having an ether bond preferably has 3 or more carbon atoms. The number of carbon atoms of the fluorine-containing alkylene group having an ether bond is preferably 60 or less, more preferably 30 or less, and even more preferably 12 or less.

The fluorine-containing alkylene group having an ether bond is also preferably a divalent group represented by the following formula:

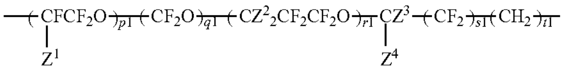

wherein $Z^1$ is F or $CF_3$; $Z^2$ and $Z^3$ are each independently H or F; $Z^4$ is H, F, or $CF_3$; p1+q1+r1 is an integer of 1 to 10; s1 is 0 or 1; and t1 is an integer of 0 to 5.

Specific examples of the fluorine-containing alkylene group having an ether bond include —$CF(CF_3)CF_2$—O—$CF(CF_3)$—, —$(CF(CF_3)$ $CF_2$—$O)_n$—$CF(CF_3)$— (wherein n is an integer of 1 to 10), —$CF(CF_3)$ $CF_2$—O—$CF(CF_3)$ $CH_2$—, —$(CF(CF_3)CF_2$—O), —$CF(CF_3)CH_2$— (wherein n is an integer of 1 to 10), —$CH_2CF_2CF_2O$—$CH_2CF_2CH_2$—, —$CF_2CF_2CF_2O$—$CF_2CF_2$—, —$CF_2CF_2CF_2O$—$CF_2CF_2CH_2$—, —$CF_2CF_2O$—$CF_2$—, and —$CF_2CF_2O$—$CF_2CH_2$—. The fluorine-containing alkylene group having an ether bond is preferably a perfluoroalkylene group.

In general formula (5), $Y^3$ is preferably —COOM, —$SO_3M$, or —$OSO_3M$ (M is H, a metal atom, $NR^7{}_4$, optionally substituted imidazolium, optionally substituted pyridinium, or optionally substituted phosphonium; and $R^7$ is H or an organic group and may be the same or different, and any two may be bonded to each other to form a ring).

The organic group of $R^7$ is preferably an alkyl group. $R^7$ is preferably H or a $C_{1-10}$ organic group, more preferably H or a $C_{1-4}$ organic group, and even more preferably H or a $C_{1-4}$ alkyl group. Examples of the metal atom include alkali metals (Group 1) and alkaline earth metals (Group 2), and Na, K, or Li is preferable. M is preferably —H, a metal atom, or —$NR^7{}_4$, more preferably —H, an alkali metal (Group 1), an alkaline earth metal (Group 2), or —$NR^7{}_4$, even more preferably —H, —Na, —K, —Li, or —$NH_4$, yet more preferably —Na, —K, or —$NH_4$, particularly preferably —Na or —$NH_4$, and most preferably —$NH_4$. $Y^3$ is preferably —COOM or —$SO_3M$, and more preferably —COOM.

The compound represented by general formula (5) is preferably a compound (5a) represented by general formula (5a):

$$CH_2{=}CF(—CF_2—O—Rf—Y^3) \quad (5a)$$

wherein Rf and $Y^3$ are as described above.

Specific examples of the compound represented by general formula (5a) include compounds represented by the following formula:

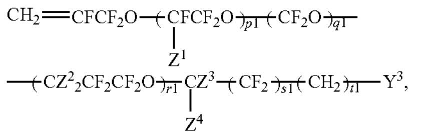

wherein $Z^1$ is F or $CF_3$; $Z^2$ and $Z^3$ are each independently H or F; $Z^4$ is H, F, or $CF_3$; p1+q1+r1 is an integer of 0 to 10; s1 is 0 or 1; t1 is an integer of 0 to 5; and $Y^3$ is as described above, provided that when $Z^3$ and $Z^4$ are both H, p1+q1+r1+s1 is not 0. More specifically, preferable examples include

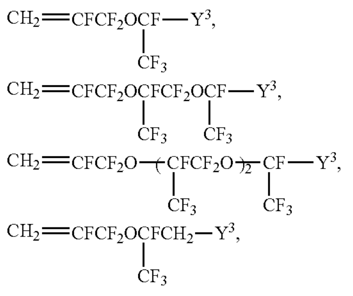

-continued

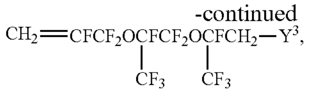

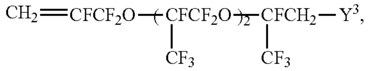

$CH_2{=}CFCF_2OCH_2CF_2{-}Y^3$, $CH_2{=}CFCF_2O(CH_2CF_2CF_2O)CH_2CF_2{-}Y^3$, $CH_2{=}CFCF_2OCH_2CF_2CH_2{-}Y^3$, $CH_2{=}CFCF_2O(CH_2CF_2CF_2O)CH_2CF_2CH_2{-}Y^3$, $CH_2{=}CFCF_2OCF_2CF_2{-}Y^3$, $CH_2{=}CFCF_2O(CF_2CF_2CF_2O)CF_2CF_2{-}Y^3$, $CH_2{=}CFCF_2OCF_2CF_2CH_2{-}Y^3$, $CH_2{=}CFCF_2O(CF_2CF_2CF_2O)CF_2CF_2CH_2{-}Y^3$, $CH_2{=}CFCF_2OCF_2{-}Y^3$, $CH_2{=}CFCF_2O(CF_2CF_2O)CF_2{-}Y^3$, $CH_2{=}CFCF_2OCF_2CH_2{-}Y^3$, $CH_2{=}CFCF_2O(CF_2CF_2O)CF_2CH_2{-}Y^3$, and, in particular,

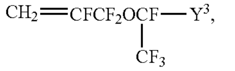

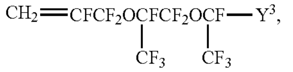

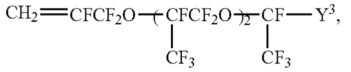

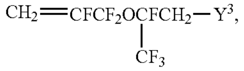

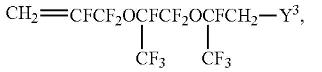

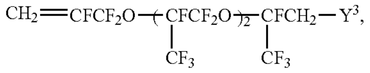

are preferable.

In the compound represented by general formula (5a), $Y^3$ in formula (5a) is preferably —COOM, and specifically the compound represented by general formula (5a) is preferably at least one selected from the group consisting of $CH_2{=}CFCF_2OCF(CF_3)COOM$ and $CH_2{=}CFCF_2OCF(CF_3)CF_2OCF(CF_3)COOM$ (wherein M is as defined above), and more preferably $CH_2{=}CFCF_2OCF(CF_3)COOM$.

The compound represented by general formula (5) is preferably a compound (5b) represented by the following general formula (5b):

$$CX^2_2{=}CFCF_2{-}O{-}(CF(CF_3)CF_2O)_{n5}{-}CF(CF_3){-}Y^3 \quad (5b)$$

wherein each $X^2$ is the same and represents F or H, n5 represents an integer of 0 or 1 to 10, and $Y^3$ is as defined above.

In general formula (5b), n5 in terms of the stability of the resulting aqueous dispersion is preferably an integer of 0 or 1 to 5, more preferably 0, 1, or 2, and even more preferably 0 or 1. $Y^3$ is preferably —COOM in terms of that a suitable water solubility and the stability of the aqueous dispersion can be obtained, and M is preferably H or $NH_4$ in terms of that M unlikely remains as an impurity, and that the heat resistance of the resulting molded article is increased.

Examples of the compound represented by general formula (5b) include $CH_2{=}CFCF_2OCF(CF_3)COOM$ and $CH_2{=}CFCF_2OCF(CF_3)CF_2OCF(CF_3)COOM$, wherein M is as defined above.

Examples of the compound represented by general formula (5) also include compounds (5c) represented by general formula (5c):

$$CF_2{=}CFCF_2{-}O{-}Rf{-}Y^3 \quad (5c)$$

wherein Rf and $Y^3$ are as described above.

More specifically, examples include $CF_2{=}CFCF_2OCF_2CF_2CF_2{-}Y^3$,

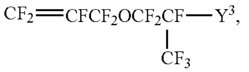

$CF_2{=}CFCF_2OCF_2CF_2CF_2CH_2{-}Y^3$,

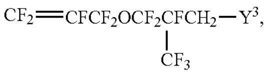

and the like.

In general formula (6), each X is —H or —F. X may be both —F, or at least one may be —H. For example, one may be —F and the other may be —H, or both may be —H.

In general formula (6), Y is —H, —F, an alkyl group, or a fluorine-containing alkyl group. The alkyl group is an alkyl group that does not contain a fluorine atom, and has one or more carbon atoms. The alkyl group preferably has 6 or less carbon atoms, more preferably 4 or less carbon atoms, and even more preferably 3 or less carbon atoms. The fluorine-containing alkyl group is an alkyl group containing at least one fluorine atom, and has one or more carbon atoms. The fluorine-containing alkyl group preferably has 6 or less carbon atoms, more preferably 4 or less carbon atoms, and even more preferably 3 or less carbon atoms. Y is preferably —H, —F, or $-CF_3$, and more preferably —F.

In general formula (6), at least one of X and Y preferably contains a fluorine atom. For example, X may be —H, and Y and Z may be —F.

In general formula (6), Rf is a fluorine-containing alkylene group having 1 to 40 carbon atoms or a fluorine-containing alkylene group having an ether bond and having 2 to 100 carbon atoms. The fluorine-containing alkylene group preferably has 2 or more carbon atoms. The fluorine-containing alkylene group preferably has 30 or less carbon atoms, more preferably 20 or less carbon atoms, and even more preferably 10 or less carbon atoms. Examples of the fluorine-containing alkylene group include $-CF_2-$, $-CH_2CF_2-$, $-CF_2CF_2-$, $-CF_2CH_2-$, $-CF_2CF_2CH_2-$, $-CF(CF_3)-$, $-CF(CF_3)CF_2-$, and $-CF(CF_3)CH_2-$. The fluorine-containing alkylene group is preferably a perfluoroalkylene group.

In general formula (6), $Y^3$ is preferably —COOM, $-SO_3M$, or $-OSO_3M$ (M is H, a metal atom, $NR^7_4$, optionally substituted imidazolium, optionally substituted pyridinium, or optionally substituted phosphonium; and $R^7$ is H or an organic group and may be the same or different, and any two may be bonded to each other to form a ring).

The organic group of $R^7$ is preferably an alkyl group. $R^7$ is preferably H or a $C_{1-10}$ organic group, more preferably H or a $C_{1-4}$ organic group, and even more preferably H or a $C_{1-4}$ alkyl group. Examples of the metal atom include alkali metals (Group 1) and alkaline earth metals (Group 2), and Na, K, or Li is preferable. M is preferably —H, a metal atom, or $—NR^7_4$, more preferably —H, an alkali metal (Group 1), an alkaline earth metal (Group 2), or $—NR^7_4$, even more preferably —H, —Na, —K, —Li, or $—NH_4$, yet more preferably —Na, —K, or $—NH_4$, particularly preferably —Na or $—NH_4$, and most preferably $—NH_4$. $Y^3$ is preferably —COOM or $—SO_3M$, and more preferably —COOM.

The compound represented by general formula (6) is preferably at least one selected from the group consisting of compounds represented by general formulae (6a) to (6f):

$$CF_2{=}CF—O—(CF_2)_{n1}—Y^3 \quad (6a)$$

wherein n1 represents an integer of 1 to 10, and $Y^3$ is as defined above, $$CF_2{=}CF—O—(CF_2C(CF_3)F)_{n2}—Y^3 \quad (6b)$$

wherein n2 represents an integer of 1 to 5, and $Y^3$ is as defined above, $$CF_2{=}CF—O—(CFX^1)_{n3}—Y^3 \quad (6c)$$

wherein $X^1$ represents F or $CF_3$, n3 represents an integer of 1 to 10, and $Y^3$ is as defined above, $$CF_2{=}CF—O—(CF_2CFX^1O)_{n4}—(CF_2)_{n6}—Y^3 \quad (6d)$$

wherein n4 represents an integer of 1 to 10, n6 represents an integer of 1 to 3, and $Y^3$ and $X^1$ are as defined above, $$CF_2{=}CF—O—(CF_2CF_2CFX^1O)_{n5}—CF_2CF_2CF_2—Y^3 \quad (6e)$$

wherein n5 represents an integer of 0 to 10, and $Y^3$ and $X^1$ are as defined above, and $$CF_2{=}CF—O(—CF_2)_{n6}—O—CF_2—Y^3 \quad (6f)$$

wherein n6 represents an integer of 1 to 6, and $Y^3$ and $X^1$ are as defined above.

In general formula (6a), n1 is preferably an integer of 5 or less, and more preferably an integer of 2 or less. $Y^3$ is preferably —COOM or $—SO_3M$ in terms of that a suitable water solubility and the stability of the aqueous dispersion can be obtained, and M is preferably Na, H, or $NH_4$ because of easy synthesis, and is preferably H or $NH_4$ in terms of that M unlikely remains as an impurity, and that the heat resistance of the resulting molded article is increased.

Examples of the compound represented by general formula (6a) include $CF_2{=}CF—O—CF_2COOM$, $CF_2{=}CF(OCF_2CF_2COOM)$, $CF_2{=}CF(OCF_2CF_2CF_2COOM)$, $CF_2{=}CF(OCF_2CF_2SO_3M)$, $CF_2{=}CF(OCF_2SO_3M)$, and $CF_2{=}CF(OCF_2CF_2CF_2SO_3M)$, wherein M is as defined above.

In general formula (6b), n2 is preferably an integer of 3 or less in terms of the stability of the resulting aqueous dispersion, $Y^3$ is preferably —COOM or $—SO_3M$ in terms of that a suitable water solubility and the stability of the aqueous dispersion can be obtained, and M is preferably H or $NH_4$ in terms of that M unlikely remains as an impurity, and that the heat resistance of the resulting molded article is increased.

In general formula (6c), n3 is preferably an integer of 5 or less in terms of water solubility, $Y^3$ is preferably —COOM or $—SO_3M$ in terms of that a suitable water solubility and the stability of the aqueous dispersion can be obtained, and M is preferably H, Na, or $NH_4$ in terms of an increased dispersion stability.

In general formula (6d), $X^1$ is preferably $—CF_3$ in terms of the stability of the aqueous dispersion, n4 is preferably an integer of 5 or less in terms of water solubility, $Y^3$ is preferably —COOM or $—SO_3M$ in terms of that a suitable water solubility and the stability of the aqueous dispersion can be obtained, and M is preferably H, Na, or $NH_4$.

Examples of the compound represented by general formula (6d) include $CF_2{=}CFOCF_2CF(CF_3)OCF_2CF_2COOM$, $CF_2{=}CFOCF_2CF(CF_3)OCF_2COOM$, $CF_2{=}CFOCF_2CF(CF_3)OCF_2CF_2CF_2COOM$, $CF_2{=}CFOCF_2CF(CF_3)OCF_2SO_3M$, $CF_2{=}CFOCF_2CF(CF_3)OCF_2CF_2SO_3M$, and $CF_2{=}CFOCF_2CF(CF_3)OCF_2CF_2CF_2SO_3M$, wherein M represents H, $NH_4$, or an alkali metal).

In general formula (6e), n5 is preferably an integer of 5 or less in terms of water solubility, $Y^3$ is preferably —COOM in terms of that a suitable water solubility and the stability of the aqueous dispersion can be obtained, and M is preferably H, Na, or $NH_4$.

Examples of the compound represented by general formula (6e) include $CF_2{=}CFOCF_2CF_2CF_2COOM$, wherein M represents H, $NH_4$, or an alkali metal.

Examples of the compound represented by general formula (6f) include $CF_2{=}CFOCF_2CF_2CF_2OCF_2COOM$, wherein M represents H, $NH_4$, or an alkali metal.

In general formula (7), Rf is preferably a fluorine-containing alkylene group having 1 to 40 carbon atoms. In general formula (7), at least one of X and Y preferably contains a fluorine atom.

The compound represented by general formula (7) is preferably at least one selected from the group consisting of a compound represented by general formula (7a):

$$CF_2{=}CF—(CF_2)_{n1}—Y^3 \quad (7a)$$

(wherein n1 represents an integer of 1 to 10, and $Y^3$ is as defined above) and a compound represented by general formula (7b):

$$CF_2{=}CF—(CF_2C(CF_3)F)_{n2}—Y^3 \quad (7b)$$

(wherein n2 represents an integer of 1 to 5, and $Y^3$ is as defined above).

$Y^3$ in general formula (7) is preferably $—SO_3M$ or —COOM, and M is preferably H, a metal atom, $NR^7_4$, optionally substituted imidazolium, optionally substituted pyridinium, or optionally substituted phosphonium. R represents H or an organic group.

In general formula (7a), n1 is preferably an integer of 5 or less, and more preferably an integer of 2 or less. $Y^3$ is preferably —COOM in terms of that a suitable water solubility and the stability of the aqueous dispersion can be obtained, and M is preferably H or $NH_4$ in terms of that M unlikely remains as an impurity, and that the heat resistance of the resulting molded article is increased.

Examples of the compound represented by general formula (7a) include $CF_2{=}CFCF_2COOM$, wherein M is as defined above.

In general formula (7b), n2 is preferably an integer of 3 or less in terms of the stability of the resulting aqueous dispersion, $Y^3$ is preferably —COOM in terms of that a suitable water solubility and the stability of the aqueous dispersion can be obtained, and M is preferably H or $NH_4$ in terms of that M unlikely remains as an impurity, and that the heat resistance of the resulting molded article is increased.

The fluorine-containing compound (A) is preferably at least one selected from the group consisting of a compound represented by general formula (5), a compound represented by general formula (6), and a compound represented by general formula (7), and more preferably at least one selected from the group consisting of a compound represented by general formula (5) and a compound represented by general formula (6), and even more preferably a compound represented by general formula (5).

The compound represented by general formula (5) is preferably at least one selected from the group consisting of a compound represented by general formula (5a), a compound represented by general formula (5b), and a compound represented by general formula (5c). In particular, at least one selected from the group consisting of a compound represented by general formula (5a) and a compound represented by general formula (5b) is more preferable, and a compound represented by general formula (5a) is even more preferable.

In the polymerization of the fluorine-containing monomer, the amount of the fluorine-containing compound (A) based on the aqueous medium is preferably 3 to 5,000 mass ppm, more preferably 5 mass ppm or more, even more preferably 10 mass ppm or more, particularly preferably 20 mass ppm or more, and most preferably 30 mass ppm or more, and is more preferably 1,000 mass ppm or less, even more preferably 500 mass ppm or less, particularly preferably 200 mass ppm or less, and most preferably 100 mass ppm or less.

It is also preferable to regulate the amount of the fluorine-containing compound (A) according to the type of the polymerization initiator used in the polymerization and the polymerization temperature.

When using a non-redox polymerization initiator as the polymerization initiator and performing the polymerization at 40 to 70° C., the amount of the fluorine-containing compound (A) is preferably 3 to 300 mass ppm, more preferably 3 to 150 mass ppm, even more preferably 5 to 100 mass ppm, and most preferably 8 to 80 mass ppm based on the aqueous medium.

When using a non-redox polymerization initiator as the polymerization initiator and performing the polymerization at higher than 70° C. and 98° C. or lower, the amount of the fluorine-containing compound (A) is preferably 3 to 500 mass ppm, more preferably 3 to 200 mass ppm, even more preferably 5 to 120 mass ppm, and most preferably 20 to 110 mass ppm based on the aqueous medium.

When using a redox polymerization initiator as the polymerization initiator and performing the polymerization at 10° C. or higher and lower than 40° C., the amount of the fluorine-containing compound (A) is preferably 3 to 300 mass ppm, more preferably 3 to 100 mass ppm, even more preferably 5 to 80 mass ppm, and most preferably 10 to 70 mass ppm based on the aqueous medium.

When using a redox polymerization initiator as the polymerization initiator and performing the polymerization at 40 to 70° C., the amount of the fluorine-containing compound (A) is preferably 3 to 500 mass ppm, more preferably 5 to 300 mass ppm, even more preferably 10 to 200 mass ppm, and most preferably 15 to 150 mass ppm based on the aqueous medium.

When using a redox polymerization initiator as the polymerization initiator and performing the polymerization at higher than 70° C. and 98° C. or lower, the amount of the fluorine-containing compound (A) is preferably 5 to 500 mass ppm, more preferably 8 to 300 mass ppm, even more preferably 15 to 200 mass ppm, and most preferably 20 to 150 mass ppm based on the aqueous medium.

With the amount of the fluorine-containing compound (A) being within the above range, the adhesion rate can be more reduced, and the polymerization time can be shortened.

The fluorine-containing compound (A) is preferably added before the polymerization initiator is added to initiate the polymerization reaction. Preferably, the fluorine-containing compound (A) is added only before the beginning of the polymerization reaction and not added after initiating the polymerization.

In the production method of the present disclosure, the polymerization temperature for polymerizing the fluorine-containing monomer is preferably 10 to 120° C., and more preferably 20 to 100° C. From the viewpoint of the stability of the aqueous dispersion and reducing the adhesion rate, the polymerization temperature is preferably 15 to 60° C., more preferably 18 to 55° C., and even more preferably 20 to 50° C. The polymerization temperature is preferably 60 to 120° C., more preferably 60 to 100° C., and even more preferably 70 to 90° C. because the polymerization rate is increased and, moreover, a fluorine-containing elastomer that provides a molded article having excellent physical properties can be obtained.

In the production method of the present disclosure, the polymerization pressure for polymerizing the fluorine-containing monomer is preferably 0.5 to 10 MPaG, and more preferably 1 to 7 MPaG.

In the polymerization of the fluorine-containing monomer, a phosphoric acid salt, sodium hydroxide, potassium hydroxide, ammonia, or the like may be used as a pH adjuster.

In the production method of the present disclosure, the fluorine-containing monomer may be polymerized in the presence or absence of fluorine-containing monomer polymerization seed particles.

The "fluorine-containing monomer polymerization seed particles" are obtained by polymerizing the fluorine-containing monomer in an aqueous medium, and are caused to be present at the time of the second polymerization in which the type and the proportion of existing components such as monomers and additives (e.g., a polymerization initiator) constituting the polymerization reaction system, the reaction conditions, and the like are different. The fluorine-containing monomer polymerization seed particles act as so-called seed particles at the time of polymerizing the fluorine-containing monomer, and constitute the polymerization of the fluorine-containing monomer in the presence of the seed particles, i.e., seed polymerization. The production method of the present disclosure may be a method in which such seed polymerization is not carried out when polymerizing the fluorine-containing monomer.

In the production method of the present disclosure, the fluorine-containing monomer is polymerized in the presence of the compound (1) and an aqueous medium, and thus adhesion of a polymer (a fluorine-containing elastomer) to a polymerization tank can be suppressed. The adhesion rate of the polymer to a polymerization tank is preferably 8 mass % or less, more preferably 4 mass % or less, even more preferably 2 mass % or less, and most preferably 1 mass % or less.

The polymer adhesion rate is a ratio (an adhesion rate to a polymerization tank) of the mass of polymer deposits adhering to the polymerization tank after completion of polymerization to the total amount of the polymer (the fluorine-containing elastomer) after completion of polymerization. Polymer deposits include the polymer adhering to the inside of a polymerization tank such as the inner wall of a polymerization tank and a stirring blade after an aqueous dispersion is removed from the polymerization tank after completion of polymerization, and the polymer that is freed from the aqueous dispersion due to aggregation and floats or precipitates without being dispersed in the aqueous dispersion. The mass of polymer deposits is the mass after water contained in the polymer deposits is dried and removed at 120° C.

Polymer adhesion rate (mass %)=Mass of polymer deposits/Mass of resulting polymer (including deposits)×100

Mass of resulting polymer=Mass of aqueous dispersion×Solid concentration (mass %) of aqueous dispersion/100+Mass of polymer deposits In one embodiment of the production method of the present disclosure, the fluorine-containing monomer is polymerized in the presence of a fluorine-free surfactant (a hydrocarbon surfactant)(provided that the compound (1) is excluded). In one embodiment of the production method of the present disclosure, the fluorine-containing monomer is polymerized substantially in the absence of a fluorine-free surfactant (a hydrocarbon surfactant) (provided that the compound (1) is excluded). According to the production method of the present disclosure, a sufficient number of fluorine-containing elastomer particles can be produced at a high polymerization rate while suppressing adhesion of the fluorine-containing elastomer to a polymerization tank, even when the fluorine-containing monomer is polymerized in the absence of the fluorine-free surfactant.

In one embodiment of the production method of the present disclosure, the fluorine-containing monomer is polymerized substantially in the absence of a fluorine-containing surfactant (provided that the compound (1) and the fluorine-containing compound (A) are excluded). According to the production method of the present disclosure, a sufficient number of fluorine-containing elastomer particles can be produced at a high polymerization rate while suppressing adhesion of the fluorine-containing elastomer to a polymerization tank, even when the fluorine-containing monomer is polymerized in the absence of the fluorine-containing surfactant.

The fluorine-containing surfactant may be an anionic fluorine-containing surfactant. The anionic fluorine-containing surfactant may be, for example, a surfactant containing a fluorine atom, in which the total number of carbon atoms in the portion excluding the anionic group is 20 or less.

The fluorine-containing surfactant may also be a fluorine-containing surfactant in which the molecular weight of the anionic moiety is 800 or less. The "anionic moiety" means a portion of the fluorine-containing surfactant excluding the cation. For example, in the case of $F(CF_2)_{n1}COOM$ represented by formula (I) as will be described below, the anionic moiety is the "$F(CF_2)_{n1}COO$" moiety.

The fluorine-containing surfactant may also be a fluorine-containing surfactant having a LogPOW of 3.5 or less. The LogPOW is a partition coefficient between 1-octanol and water, and is represented by LogP wherein P represents a ratio of the fluorine-containing surfactant concentration in octanol/the fluorine-containing surfactant concentration in water attained when an octanol/water (1:1) mixture containing the fluorine-containing surfactant is phase-separated.

The LogPOW is calculated by performing HPLC on standard substances (heptanoic acid, octanoic acid, nonanoic acid, and decanoic acid) having a known octanol/water partition coefficient under conditions having column: TOSOH ODS-120T column (φ4.6 mm×250 mm, manufactured by Tosoh Corporation), eluent: acetonitrile/0.6 mass % $HClO_4$ solution=1/1 (vol/vol %), flow rate: 1.0 ml/min, sample volume: 300 μL, column temperature: 40° C., detection light: UV210 nm to construct a calibration curve concerning each elution time and known octanol/water partition coefficient, and determining the HPLC elution time of a sample liquid based on the calibration curve.

Specific examples of the fluorine-containing surfactant include those described in U.S. Patent Application Publication No. 2007/0015864, U.S. Patent Application Publication No. 2007/0015865, U.S. Patent Application Publication No. 2007/0015866, U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO 2005/042593, International Publication No. WO 2008/060461, International Publication No. WO 2007/046377, Japanese Patent Laid-Open No. 2007-119526, International Publication No. WO 2007/046482, International Publication No. WO 2007/046345, U.S. Patent Application Publication No. 2014/0228531, International Publication No. WO 2013/189824, and International Publication No. WO 2013/189826.

The anionic fluorine-containing surfactant may be a compound represented by the following general formula ($N^0$):

$$X^{n0}\text{—}Rf^{n0}\text{—}Y^0 \qquad (N^0)$$

wherein $X^{n0}$ is H, Cl, or F; $Rf^{n0}$ is an alkylene group that has 3 to 20 carbon atoms, that is linear, branched, or cyclic, and H of which is partially or entirely replaced with F, the alkylene group may contain one or more ether bonds, and H may be partially replaced with Cl; and $Y^0$ is an anionic group.

The anionic group $Y^0$ may be —COOM, —$SO_2M$, or —$SO_3M$, and may be —COOM or —$SO_3M$.

M is H, a metal atom, $NR^7_4$, optionally substituted imidazolium, optionally substituted pyridinium, or optionally substituted phosphonium, and $R^7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

In $Rf^{n0}$, 50% or more of H may be replaced with fluorine.

Examples of the compound represented by general formula ($N^0$) include a compound represented by the following general formula (N1):

$$X^{n0}\text{—}(CF_2)_{m1}\text{—}Y^0 \qquad (N1)$$

(wherein $X^{n0}$ is H, Cl, or F, m1 is an integer of 3 to 15, and $Y^0$ is as defined above); a compound represented by the following general formula ($N^2$):

$$Rf^{n1}\text{—}O\text{—}(CF(CF_3)CF_2O)_{m2}CFX^{n1}\text{—}Y^0 \qquad (N^2)$$

(wherein $Rf^{n1}$ is a perfluoroalkyl group having 1 to 5 carbon atoms, m2 is an integer of 0 to 3, $X^{n1}$ is F or $CF_3$, and $Y^0$ is as defined above); a compound represented by the following general formula ($N^3$):

$$Rf^{n2}(CH_2)_{m3}\text{—}(Rf^{n3})_q\text{—}Y^0 \qquad (N^3)$$

(wherein $Rf^{n2}$ is a partially or fully fluorinated alkyl group having 1 to 13 carbon atoms and optionally containing an ether bond, m3 is an integer of 1 to 3, $Rf^{n3}$ is a linear or branched perfluoroalkylene group having 1 to 3 carbon atoms, q is 0 or 1, and $Y^0$ is as defined above); a compound represented by the following general formula ($N^4$):

$$Rf^{n4}—O—(CY^{n1}Y^{n2})_pCF_2—Y^0 \quad (N^4)$$

(wherein $Rf^{n4}$ is a linear or branched partially or fully fluorinated alkyl group having 1 to 12 carbon atoms and optionally containing an ether bond and/or a chlorine atom, $Y^{n1}$ and $Y^{n2}$ are the same or different and are each H or F, p is 0 or 1, and $Y^0$ is as defined above); and a compound represented by the following general formula ($N^5$):

($N^5$)

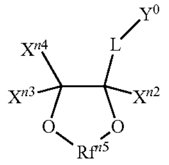

(wherein $X^{n2}$, $X^{n3}$, and $X^{n4}$ may be the same or different and are each independently H, F, or a linear or branched, partially or fully fluorinated alkyl group having 1 to 6 carbon atoms and optionally containing an ether bond, $Rf^{n5}$ is a linear or branched, partially or fully fluorinated alkylene group having 1 to 3 carbon atoms and optionally containing an ether bond, L is a linking group, and $Y^0$ is as defined above, provided that the total number of carbon atoms of $X^{n2}$, $X^{n3}$, $X^{n4}$, and $Rf^{n5}$ is 18 or less).

Specific examples of the compound represented by general formula ($N^0$) include perfluorocarboxylic acid (I) represented by the following general formula (I), ω-H perfluorocarboxylic acid (II) represented by the following general formula (II), perfluoroether carboxylic acid (III) represented by the following general formula (III), perfluoroalkylalkylenecarboxylic acid (IV) represented by the following general formula (IV), perfluoroalkoxyfluorocarboxylic acid (V) represented by the following general formula (V), perfluoroalkylsulfonic acid (VI) represented by the following general formula (VI), ω-H perfluorosulfonic acid (VII) represented by the following general formula (VII), perfluoroalkylalkylene sulfonic acid (VIII) represented by the following general formula (VIII), alkylalkylenecarboxylic acid (IX) represented by the following general formula (IX), fluorocarboxylic acid (X) represented by the following general formula (X), alkoxyfluorosulfonic acid (XI) represented by the following general formula (XI), compound (XII) represented by the following general formula (XII), and compound (XIII) represented by the following general formula (XIII).

The perfluorocarboxylic acid (I) is represented by the following general formula (I):

$$F(CF_2)_{n1}COOM \quad (I)$$

wherein n1 is an integer of 3 to 14, M is H, a metal atom, $NR^7_4$, an optionally substituted imidazolium, optionally substituted pyridinium, or optionally substituted phosphonium, and $R^7$ is H or an organic group.

The ω-H perfluorocarboxylic acid (II) is represented by the following general formula (II):

$$H(CF_2)_{n2}COOM \quad (II)$$

wherein n2 is an integer of 4 to 15; and M is as defined above.

The perfluoroethercarboxylic acid (III) is represented by the following general formula (III):

$$Rf^1—O—(CF(CF_3)CF_2O)_{n3}CF(CF_3)COOM \quad (III)$$

wherein $Rf^1$ is a perfluoroalkyl group having 1 to 5 carbon atoms, n3 is an integer of 0 to 3, and M is as defined above.

The perfluoroalkylalkylenecarboxylic acid (IV) is represented by the following general formula (IV):

$$Rf^2(CH_2)_{n4}Rf^3COOM \quad (IV)$$

wherein $Rf^2$ is a perfluoroalkyl group having 1 to 5 carbon atoms, $Rf^3$ is a linear or branched perfluoroalkylene group having 1 to 3 carbon atoms, n4 is an integer of 1 to 3, and M is as defined above.

The alkoxyfluorocarboxylic acid (V) is represented by the following general formula (V):

$$Rf^4—O—CY^1Y^2CF_2—COOM \quad (V)$$

wherein $Rf^4$ is a linear or branched, partially or fully fluorinated alkyl group having 1 to 12 carbon atoms and optionally containing an ether bond and/or a chlorine atom, $Y^1$ and $Y^2$ are the same or different and are H or F, and M is as defined above.

The perfluoroalkylsulfonic acid (VI) is represented by the following general formula (VI):

$$F(CF_2)_{n5}SO_3M \quad (VI)$$

wherein n5 is an integer of 3 to 14, and M is as defined above.

The ω-H perfluorosulfonic acid (VII) is represented by the following general formula (VII):

$$H(CF_2)_{n6}SO_3M \quad (VII)$$

wherein n6 is an integer of 4 to 14, and M is as defined above.

The perfluoroalkylalkylenesulfonic acid (VIII) is represented by the following general formula (VIII):

$$Rf^5(CH_2)_{n7}SO_3M \quad (VIII)$$

wherein $Rf^5$ is a perfluoroalkyl group having 1 to 13 carbon atoms, n7 is an integer of 1 to 3, and M is as defined above.

The alkylalkylenecarboxylic acid (IX) is represented by the following general formula (IX):

$$Rf^6(CH_2)_{n8}COOM \quad (IX)$$

wherein $Rf^6$ is a linear or branched, partially or fully fluorinated alkyl group having 1 to 13 carbon atoms and optionally containing an ether bond, n8 is an integer of 1 to 3, and M is as defined above.

The fluorocarboxylic acid (X) is represented by the following general formula (X):

$$Rf^7—O—Rf^8—O—CF_2—COOM \quad (X)$$

wherein $Rf^7$ is a linear or branched, partially or fully fluorinated alkyl group having 1 to 6 carbon atoms and optionally containing an ether bond and/or a chlorine atom, $Rf^8$ is a linear or branched, partially or fully fluorinated alkyl group having 1 to 6 carbon atoms, and M is as defined above.

The alkoxyfluorosulfonic acid (XI) is represented by the following general formula (XI):

$$Rf^9—O—CY^1Y^2CF_2—SO_3M \quad (XI)$$

wherein $Rf^9$ is a linear or branched, partially or fully fluorinated alkyl group having 1 to 12 carbon atoms, optionally containing chlorine, and optionally containing an ether bond, $Y^1$ and $Y^2$ are the same or different and are H or F, and M is as defined above.

The compound (XII) is represented by the following general formula (XII):

(XII)

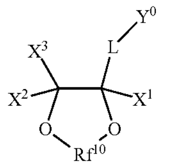

wherein $X^1$, $X^2$, and $X^3$ are the same or different, and each independently are H, F, or a linear or branched, partially or fully fluorinated alkyl group having 1 to 6 carbon atoms and optionally containing an ether bond, $Rf^{10}$ is a perfluoroalkylene group having 1 to 3 carbon atoms, L is a linking group, and $Y^0$ is an anionic group.

$Y^0$ may be —COOM, —$SO_2M$, or —$SO_3M$, and may be —$SO_3M$ or —COOM, wherein M is defined above.

Examples of L include a single bond, and a partially or fully fluorinated alkylene group having 1 to 10 carbon atoms and optionally containing an ether bond.

The compound (XIII) is represented by the following general formula (XIII):

$$Rf^{11}—O—(CF_2CF(CF_3)O)_{n9}(CF_2O)_{n10}CF_2COOM \quad (XIII)$$

wherein $Rf^{11}$ is a fluoroalkyl group having 1 to 5 carbon atoms and containing chlorine, n9 is an integer of 0 to 3, n10 is an integer of 0 to 3, and M is as defined above. Examples of the compound (XIII) include $CF_2ClO(CF_2CF(CF_3)O)_{n9}(CF_2O)_{n10}CF_2COONH_4$ (a mixture having an average molecular weight of 750, wherein n9 and n10 are as defined above).

In one embodiment of the production method of the present disclosure, the fluorine-containing monomer is polymerized in the presence of a fluorine-containing surfactant (provided that the compound (1) and the fluorine-containing compound (A) are excluded). In one embodiment of the production method of the present disclosure, the fluorine-containing monomer can be polymerized in the absence of a fluorine-containing compound represented by general formula: X—$(CF_2)_{m2}$—Y. In one embodiment of the production method of the present disclosure, the fluorine-containing monomer can be polymerized in the presence of a fluorine-containing surfactant (provided that the compound (1) and the fluorine-containing compound (A) are excluded) and in the absence of a fluorine-containing compound represented by general formula: X—$(CF_2)_{m2}$—Y.

Among the fluorine-containing surfactants (provided that the compound (1) and the fluorine-containing compound (A) are excluded), examples of the fluorine-containing surfactant that can be caused to be present during polymerization include fluorine-containing surfactants other than the fluorine-containing compound represented by general formula X—$(CF_2)_{m2}$—Y wherein X represents H or F, m2 represents an integer of 6 or more, and Y represents —$SO_3M$, —$SO_4M$, —$SO_3R$, —$SO_4R$, —COOM, —$PO_3M_2$, —$PO_4M_2$(M represents H, $NH_4$, or an alkali metal, and R represents an alkyl group having 1 to 12 carbon atoms). In one embodiment of the production method of the present disclosure, the fluorine-containing monomer is preferably polymerized in the presence of a fluorine-containing surfactant (provided that the compound (1), the fluorine-containing compound (A), and the fluorine-containing compound represented by general formula X—$(CF_2)_{m2}$—Y are excluded).

Among the fluorine-containing surfactants exemplified above as fluorine-containing surfactants that are not caused to be present during polymerization, examples of the fluorine-containing surfactant that can be caused to be present during polymerization include fluorine-containing surfactants other than the fluorine-containing compound represented by general formula X—$(CF_2)_{m2}$—Y wherein X represents H or F, m2 represents an integer of 6 or more, and Y represents —$SO_3M$, —$SO_4M$, —$SO_3R$, —$SO_4R$, —COOM, —$PO_3M_2$, —$PO_4M_2$(M represents H, $NH_4$, or an alkali metal, and R represents an alkyl group having 1 to 12 carbon atoms). Examples of the fluorine-containing surfactants that can be caused to be present during polymerization include those described in International Publication No. WO 2019/009248, International Publication No. WO 2007/120346, International Publication No. WO 2007/011633, International Publication No. WO 2007/011631, and International Publication No. WO 2007/062059.

By the production method of the present disclosure, an aqueous dispersion of a fluorine-containing elastomer is obtained. The resulting aqueous dispersion of a fluorine-containing elastomer preferably has a solid concentration (a fluorine-containing elastomer content) of 10 to 50 mass %, more preferably 15 to 40 mass %, and even more preferably 20 to 30 mass %, when polymerization is complete.

The aqueous dispersion obtained by the production method of the present disclosure and the fluorine-containing elastomer contained in the aqueous dispersion of the present disclosure may contain a monomer unit based on a compound (1) having a triple bond and a hydrophilic group.

The present disclosure also relates to a fluorine-containing elastomer comprising a monomer unit based on a compound (1) having a triple bond and an anionic hydrophilic group. The fluorine-containing elastomer of the present disclosure can be suitably produced by using a compound (1) having a triple bond and an anionic hydrophilic group as the compound (1) in the production method of the present disclosure.

The content of the monomer unit based on the compound (1) in the fluorine-containing elastomer is preferably 0.0009 to 1.5 mass %, more preferably 0.0015 mass % or more, even more preferably 0.0030 mass % or more, particularly preferably 0.0060 mass % or more, and most preferably 0.0090 mass % or more, and is more preferably 0.30 mass % or less, even more preferably 0.15 mass % or less, particularly preferably 0.09 mass % or less, and most preferably 0.06 mass % or less, based on all monomer units. When the content of the monomer unit based on the compound (1) is excessive, the properties required of the fluorine-containing elastomer may be impaired.

The content of the monomer unit based on the compound (1) in the fluorine-containing elastomer can be calculated by any suitable combination of NMR, FT-IR, elemental analysis, and X-ray fluorescence analysis according to the type of monomer.

The present disclosure also relates to an aqueous dispersion containing a fluorine-containing elastomer and an aqueous medium. The aqueous dispersion of the present disclosure can be suitably produced by the production method of the present disclosure.

The fluorine-containing elastomer in the aqueous dispersion of the present disclosure may have the same constitution as that of the fluorine-containing elastomer contained in the aqueous dispersion obtained by the production method of the present disclosure. For example, the fluorine-containing elastomer may contain a monomer unit based on a compound (1) having a triple bond and a hydrophilic group or a monomer unit based on the compound (1) having a triple bond and an anionic hydrophilic group. The fluorine-containing elastomer may contain a monomer unit based on a fluorine-containing monomer.

The content of the fluorine-containing elastomer in the aqueous dispersion is preferably 10 to 50 mass %, more preferably 15 to 40 mass %, and even more preferably 20 to 30 mass %.

The content (the solid concentration) of the fluorine-containing elastomer in the aqueous dispersion can be determined by drying 1 g of the aqueous dispersion under 150° C. and 180-minute conditions, measuring the mass of the heating residue, and calculating the proportion of the mass of the heating residue to the mass of the aqueous dispersion.

The aqueous dispersion of the fluorine-containing elastomer may contain fluorine-containing elastomer particles. The average particle size of fluorine-containing elastomer particles is preferably 10 to 800 nm, more preferably 50 to 500 nm, and more preferably 70 to 300 nm. The average particle size of fluorine-containing elastomer particles is a cumulant average diameter and can be measured by dynamic light scattering.

The number of fluorine-containing elastomer particles contained in the aqueous dispersion of a fluorine-containing elastomer is preferably $1.0\times10^{12}$ particles/cc or more, more preferably $5.0\times10^{12}$ particles/cc or more, and even more preferably $1.0\times10^{13}$ particles/cc or more. The number of particles (the number of polymer particles) can be calculated in accordance with the following expression:

$$\text{Number of polymer particles} = \left\{\frac{\text{Solid concentration of aqueous dispersion (mass \%)}}{100-\text{Solid conentration of aqueous dispersion (mass \%)}}\right\} \Big/ \left\{\frac{4}{3}\times3.14\times\left(\frac{\text{Average particle size (nm)}}{2}\times10^{-9}\right)^3\times\text{Specific gravity}\times10^6\right\}$$

The number of fluorine-containing elastomer particles obtained by the expression is the number of particles per 1 cc of water. The specific gravity is the specific gravity of the fluorine-containing elastomer. The specific gravity of the fluorine-containing elastomer can be determined in accordance with JIS Z 8807:2012.

In one embodiment of the aqueous dispersion, a fluorine-containing surfactant is contained (provided that the compound (1) and the fluorine-containing compound (A) are excluded). The aqueous dispersion containing a fluorine-containing surfactant has an advantage that it can be stably produced with high productivity using the fluorine-containing surfactant (provided that the compound (1) and the fluorine-containing compound (A) are excluded). The fluorine-containing surfactant is preferably a fluorine-containing surfactant (provided that the compound (1), the fluorine-containing compound (A), and the fluorine-containing compound represented by general formula X—$(CF_2)_{m2}$—Y are excluded), and examples include those exemplified as fluorine-containing surfactants that can be caused to be present during polymerization. The fluorine-containing surfactant is more preferably a fluorine-containing surfactant (provided that the compound (1) and the fluorine-containing compound (A) are excluded). The aqueous dispersion does not need to contain a fluorine-containing compound represented by general formula: X—$(CF_2)_{m2}$—Y.

In one embodiment of the aqueous dispersion, the fluorine-containing surfactant is substantially not contained (provided that the compound (1) and the fluorine-containing compound (A) are excluded). The aqueous dispersion that is substantially free of a fluorine-containing surfactant needs to be produced by polymerizing the fluorine-containing monomer without using a fluorine-containing surfactant (provided that the compound (1) and the fluorine-containing compound (A) are excluded), and such an aqueous dispersion can be produced by the fluorine-containing elastomer production method of the present disclosure involving the compound (1).

In the present disclosure, "substantially free of a fluorine-containing surfactant" means that the content of the fluorine-containing surfactant (provided that the compound (1) and the fluorine-containing compound (A) are excluded) in the aqueous dispersion is 10 mass ppm or less, preferably 1 mass ppm or less, more preferably 100 mass ppb or less, yet more preferably 10 mass ppb or less, further preferably 1 mass ppb or less, and particularly preferably less than the detection limit of measurement by liquid chromatography-mass spectrometry (LC/MS).

The content of the fluorine-containing surfactant (provided that the compound (1) and the fluorine-containing compound (A) are excluded) can be quantified by a known method. For example, it can be quantified by LC/MS analysis. First, methanol is added to an aqueous dispersion, extraction is performed, and the resulting extract is subjected to LC/MS analysis.

To further increase extraction efficiency, treatment by Soxhlet extraction, ultrasonic treatment, or the like may be performed.

From the resulting LC/MS spectrum, molecular weight information is extracted, and a match with the structural formula of a candidate fluorine-containing surfactant is checked.

Thereafter, aqueous solutions having five or more different content levels of the confirmed fluorine-containing surfactant are prepared, and LC/MS analysis of the aqueous solution of each content is performed, and the relationship between the content and the area for the content is plotted, and a calibration curve is drawn.

Then, using the calibration curve, the area of the LC/MS chromatogram of the fluorine-containing surfactant in the extract can be converted into the content of the fluorine-containing surfactant.

The aqueous dispersion of the fluorine-containing elastomer can further contain a cross-linking agent, a filler, and the like. The cross-linking agent and the like will be described below.

The aqueous dispersion of the fluorine-containing elastomer can be formed into a dispersion suitable for rubber molding by addition of a dispersion stabilizer such as a hydrocarbon surfactant (provided that the compound (1) is excluded), concentration, and the like, as necessary. The above dispersion is treated by pH adjustment, coagulation, heating, or the like. Each treatment is performed as follows.

A treatment such as coagulation or heating may be performed on the aqueous dispersion of a fluorine-containing elastomer.

Coagulation can be carried out by adding an alkaline earth or earth metal salt to the aqueous dispersion. Examples of the alkaline earth or earth metal salt include a sulfuric acid salt, a nitric acid salt, a hydrochloric acid salt, and an acetic acid salt of calcium, magnesium, and aluminum.

The coagulated fluorine-containing elastomer may be washed with water to remove a small amount of impurities such as a buffer and a salt present in the fluorine-containing elastomer, and then the washed fluorine-containing elastomer may be dried. The drying temperature is preferably 40 to 200° C., more preferably 60 to 180° C., and more preferably 80 to 150° C.

The present disclosure also relates to a composition containing a fluorine-containing elastomer. The composition of the present disclosure can be suitably produced by the production method of the present disclosure.

The fluorine-containing elastomer in the composition of the present disclosure may have the same constitution as that of the fluorine-containing elastomer contained in the aqueous dispersion obtained by the production method of the present disclosure. For example, the fluorine-containing elastomer may contain a monomer unit based on the compound (1) having a triple bond and a hydrophilic group. The fluorine-containing elastomer may contain a monomer unit based on a fluorine-containing monomer.

The form of the fluorine-containing elastomer and the composition is not limited, and may be gum, crumb, powder, pellet, or the like, and is preferably gum or crumb. Gum is a small mass of particles made of the fluorine-containing elastomer, and crumb is in the form of an amorphous mass as a result of the fluorine-containing elastomer being unable to maintain a small particulate form as a gum at room temperature and fusing to each other. Gum or crumb is suitably obtained by coagulation, drying, or the like by a conventionally known method from the aqueous dispersion obtained by the production method of the present disclosure.

The water content of the composition is not limited, but is preferably 1 mass % or less, more preferably 0.1 mass % or less, and even more preferably 0.01 mass % or less, based on the mass of the composition. The water content of the composition can be calculated, for example, by heating the composition to 120° C. or higher to sufficiently dry the composition, measuring the weight of the composition before and after the heating, and dividing the weight loss by the weight before the heating.

In one embodiment of the composition of the present disclosure, a fluorine-containing surfactant is contained (provided that the compound (1) and the fluorine-containing compound (A) are excluded). The composition containing a fluorine-containing surfactant has an advantage that it can be stably produced with high productivity using the fluorine-containing surfactant (provided that the compound (1) and the fluorine-containing compound (A) are excluded). The fluorine-containing surfactant is preferably a fluorine-containing surfactant (provided that the compound (1), the fluorine-containing compound (A), and the fluorine-containing compound represented by general formula $X—(CF_2)_2—Y$ are excluded), and examples include those exemplified as fluorine-containing surfactants that can be caused to be present during polymerization. The fluorine-containing surfactant is more preferably a fluorine-containing surfactant (provided that the compound (1) and the fluorine-containing compound (A) are excluded). The composition does not need to contain a fluorine-containing compound represented by general formula: $X—(CF_2)_{m2}—Y$.

In one embodiment of the composition of the present disclosure, the fluorine-containing surfactant is substantially not contained (provided that the compound (1) and the fluorine-containing compound (A) are excluded). The composition that is substantially free of a fluorine-containing surfactant needs to be produced by polymerizing the fluorine-containing monomer without using a fluorine-containing surfactant (provided that the compound (1) and the fluorine-containing compound (A) are excluded), and such a composition can be produced by the fluorine-containing elastomer production method of the present disclosure involving the compound (1).

In the present disclosure, "substantially free of a fluorine-containing surfactant" means that the content of the fluorine-containing surfactant (provided that the compound (1) and the fluorine-containing compound (A) are excluded) in the composition is 10 mass ppm or less, preferably 1 mass ppm or less, more preferably 100 mass ppb or less, yet more preferably 10 mass ppb or less, further preferably 1 mass ppb or less, and particularly preferably less than the detection limit of measurement by liquid chromatography-mass spectrometry (LC/MS).

The content of the fluorine-containing surfactant (provided that the compound (1) and the fluorine-containing compound (A) are excluded) can be quantified by a known method. For example, it can be quantified by LC/MS analysis. First, extraction is performed by adding methanol to the composition, and the obtained extracted liquid is subjected to LC/MS analysis.

To further increase extraction efficiency, treatment by Soxhlet extraction, ultrasonic treatment, or the like may be performed.

From the resulting LC/MS spectrum, molecular weight information is extracted, and a match with the structural formula of a candidate fluorine-containing surfactant is checked.

Thereafter, aqueous solutions having five or more different content levels of the confirmed fluorine-containing surfactant are prepared, and LC/MS analysis of the aqueous solution of each content is performed, and the relationship between the content and the area for the content is plotted, and a calibration curve is drawn.

Then, using the calibration curve, the area of the LC/MS chromatogram of the fluorine-containing surfactant in the extract can be converted into the content of the fluorine-containing surfactant.

The composition of the present disclosure may further contain a cross-linking agent, a filler, and the like. The cross-linking agent and the like will be described below.

A fluorine-containing elastomer composition can be produced by adding a cross-linking agent, a filler, and the like to a fluorine-containing elastomer obtained by the production method of the present disclosure, the fluorine-containing elastomer of the present disclosure, or the composition of the present disclosure. The type and the amount of the cross-linking agent and the filler are not limited, and the cross-linking agent and the filler can be used within a known range.

The method for obtaining the fluorine-containing elastomer composition is not limited as long as the method is capable of uniformly mixing the fluorine-containing elastomer obtained by the production method of the present disclosure, the fluorine-containing elastomer of the present disclosure, or the composition of the present disclosure, with a cross-linking agent, a filler, and the like. An example may be a method involving kneading a powder obtained by coagulating the fluorine-containing elastomer alone and, if necessary, another additive or a compounding agent with a kneader such as an open roll.

When the fluorine-containing elastomer is an uncrosslinked elastomer, example of the crosslinking system therefor include a peroxide crosslinking system, a polyol crosslinking system, or a polyamine crosslinking system, and the crosslinking system is preferably at least one selected from the group consisting of a peroxide crosslinking system and a polyol crosslinking system. From the viewpoint of chemical resistance, a peroxide crosslinking system is preferable, and from the viewpoint of heat resistance, a polyol crosslinking system is preferable.

Accordingly, the cross-linking agent is preferably at least one cross-linking agent selected from the group consisting of a polyol cross-linking agent and a peroxide cross-linking agent, and more preferably a peroxide cross-linking agent.

The amount of the cross-linking agent contained is suitably selected according to the type of the cross-linking agent and the like, and is preferably 0.2 to 6.0 parts by mass and more preferably 0.3 to 5.0 parts by mass based on 100 parts by mass of the fluorine-containing elastomer composition.

Peroxide crosslinking can be carried out by using an uncrosslinked elastomer capable of peroxide crosslinking as a fluorine-containing elastomer and an organic peroxide as a cross-linking agent.

The uncrosslinked elastomer capable of peroxide crosslinking is not limited, and may be an uncrosslinked elastomer having a site capable of peroxide crosslinking. The site capable of peroxide crosslinking is not limited, and examples include a site having an iodine atom and a site having a bromine atom.

The organic peroxide may be an organic peroxide capable of readily producing peroxy radicals in the presence of heat and a redox system, and examples include 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butyl peroxybenzene, t-butyl peroxymaleate, t-butyl peroxyisopropyl carbonate, and t-butyl peroxybenzoate. Among these, 2,5-dimethyl-2,5-di(t-butylperoxy)hexane and 2,5-dimethyl-2,5-di(t-butylperoxy)-hexyne-3 are preferable.

The amount of the organic peroxide contained is preferably 0.1 to 15 parts by mass and more preferably 0.3 to 5 parts by mass based on 100 parts by mass of the fluorine-containing elastomer.

When the cross-linking agent is an organic peroxide, the fluorine-containing elastomer composition preferably further contains a cross-linking aid. Examples of the cross-linking aid include triallyl cyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, N,N-diallylacrylamide, 1,6-divinyldodecafluorohexane, hexaallyl phosphoramide, N,N,N',N'-tetraallyl phthalamide, N,N,N',N'-tetraallyl malonamide, trivinyl isocyanurate, 2,4,6-trivinylmethyltrisiloxane, tri(5-norbornene-2-methylene)cyanurate, triallyl phosphite, and trimethallyl isocyanurate. Among these, triallyl isocyanurate (TAIC) is preferable in terms of excellent crosslinkability, mechanical properties, and flexibility.

The amount of the cross-linking aid contained is preferably 0.01 to 10 parts by mass, more preferably 0.01 to 7.0 parts by mass, and even more preferably 0.1 to 5.0 parts by mass based on 100 parts by mass of the fluorine-containing elastomer. An amount of the cross-linking aid of less than 0.01 parts by mass results in poor mechanical properties and poor flexibility. An amount exceeding 10 parts by mass tends to result in inferior heat resistance and also poor durability of a molded article.

Polyol crosslinking can be carried out by using an uncrosslinked elastomer capable of polyol crosslinking as a fluorine-containing elastomer and a polyhydroxy compound as a cross-linking agent. In the polyol crosslinking system, the amount of the polyhydroxy compound contained is preferably 0.01 to 10 parts by mass based on 100 parts by mass of the uncrosslinked elastomer capable of polyol crosslinking. When the amount of the polyhydroxy compound contained is in such a range, polyol crosslinking can be sufficiently promoted. The amount is more preferably 0.02 to 8 parts by mass. The amount is even more preferably 0.03 to 4 parts by mass.

The uncrosslinked elastomer capable of polyol crosslinking is not limited, and is an uncrosslinked elastomer having a site capable of polyol crosslinking. The site capable of polyol crosslinking is not limited, and may be, for example, a site having a vinylidene fluoride (VdF) unit. The method for introducing the crosslinking site may be a method involving copolymerizing a monomer that provides a crosslinking site at the time of polymerization of an uncrosslinked elastomer.

A suitable polyhydroxy compound may be a polyhydroxy aromatic compound in terms of excellent heat resistance.

The polyhydroxy aromatic compound is not limited, and examples include 2,2-bis(4-hydroxyphenyl)propane (hereinafter referred to as bisphenol A), 2,2-bis(4-hydroxyphenyl)perfluoropropane (hereafter referred to as bisphenol AF, and bisphenol AF is available from, for example, FUJIFILM Wako Pure Chemical Corporation or Central Glass Co., Ltd.), 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valeric acid, 2,2-bis(4-hydroxyphenyl)tetrafluorodichloropropane, 4,4'-dihydroxydiphenyl sulfone, 4,4'-dihydroxydiphenylketone, tri(4-hydroxyphenyl)methane, 3,3',5,5'-tetrachlorobisphenol A, and 3,3',5,5'-tetrabromobisphenol A. These polyhydroxy aromatic compounds may be alkali metal salts, alkaline earth metal salts, and the like, and when the copolymer is coagulated with acid, the metal salts are preferably not used. The amount of the polyhydroxy aromatic compound contained is 0.1 to 15 parts by mass and preferably 0.5 to 5 parts by mass based on 100 parts by mass of the uncrosslinked elastomer.

When the cross-linking agent is a polyhydroxy compound, the fluorine-containing elastomer composition preferably further contains a crosslinking accelerator. The crosslinking accelerator promotes formation of an intramolecular double bond in the dehydrofluorination reaction of the polymer main chain and addition of a polyhydroxy compound to the formed double bond.

The crosslinking accelerator may be used in combination with an acid acceptor such as magnesium oxide or with a cross-linking aid.

Examples of the crosslinking accelerator include onium compounds, and among onium compounds, the crosslinking accelerator is preferably at least one selected from the group consisting of ammonium compounds such as a quaternary ammonium salt, phosphonium compounds such as a quaternary phosphonium salt, oxonium compounds, sulfonium compounds, cyclic amines, and monofunctional amine compounds, and more preferably at least one selected from the group consisting of quaternary ammonium salts and quaternary phosphonium salts.

The quaternary ammonium salt is not limited, and examples include 8-methyl-1,8-diazabicyclo[5,4,0]-7-undecenium chloride, 8-methyl-1,8-diazabicyclo[5,4,0]-7-undecenium iodide, 8-methyl-1,8-diazabicyclo[5,4,0]-7-undecenium hydroxide, 8-methyl-1,8-diazabicyclo[5,4,0]-7-undecenium methyl sulfate, 8-ethyl-1,8-diazabicyclo[5,4,0]-7-undecenium bromide, 8-propyl-1,8-diazabicyclo[5,4,0]-7-undecenium bromide, 8-dodecyl-1,8-diazabicyclo[5,4,0]-7-undecenium chloride, 8-dodecyl-1,8-diazabicyclo[5,4,0]-7-undecenium hydroxide, 8-eicosyl-1,8-diazabicyclo[5,4,0]-7-undecenium chloride, 8-tetracosyl-1,8-diazabicyclo[5,4,0]-7-undecenium chloride, 8-benzyl-1,8-diazabicyclo[5,4,0]-7-undecenium chloride (hereinafter referred to as DBU-B, and DBU-B is available from, for example, FUJIFILM Wako Pure Chemical Corporation), 8-benzyl-1,8-diazabicyclo[5,4,0]-7-undecenium hydroxide, 8-phenethyl-1,8-diazabicyclo[5,4,0]-7-undecenium chloride, 8-(3-phenylpropyl)-1,8-diazabicyclo[5,4,0]-7-undecenium chloride, tetrabutylammonium hydrogensulfate, tetrabutylammonium hydroxide, tetrabutylammonium chloride, and tetrabutylammonium bromide. Among these, DBU-B is preferable in terms of crosslinkability, mechanical properties, and flexibility.

The quaternary phosphonium salt is not limited, and examples include tetrabutylphosphonium chloride, benzyltriphenylphosphonium chloride (hereinafter referred to as BTPPC), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride, and among these, benzyltriphenylphosphonium chloride (BTPPC) is preferable in terms of crosslinkability, mechanical properties, and flexibility.

The crosslinking accelerator may be a solid solution of a quaternary ammonium salt and bisphenol AF, a solid solution of a quaternary phosphonium salt and bisphenol AF, or a chlorine-free crosslinking accelerator disclosed in Japanese Patent Laid-Open No. 11-147891.

The amount of the crosslinking accelerator contained is preferably 0.01 to 8.00 parts by mass and more preferably 0.02 to 5.00 parts by mass based on 100 parts by mass of the uncrosslinked elastomer. The amount is even more preferably 0.03 to 3.00 parts by mass. When the amount of the crosslinking accelerator is less than 0.01 parts by mass, there is a possibility that the crosslinking of the uncrosslinked elastomer does not sufficiently proceed, and the resulting molded article has poor heat resistance and the like. When the amount exceeds 8.00 parts by mass, there is a possibility that the fluorine-containing elastomer composition has poor mold processability, and there is a tendency that elongation with respect to mechanical properties is reduced, and flexibility is also reduced.

The acid acceptor is used to neutralize an acidic substance produced during polyol crosslinking, and specific examples include magnesium oxide, calcium hydroxide (such as NICC 5000 (manufactured by Inoue Calcium Corporation), CALDIC #2000, CALDIC #1000 (manufactured by Ohmi Chemical Industry Co., Ltd.)), calcium oxide, litharge (lead oxide), zinc oxide, dibasic lead phosphite, and hydrotalcite, and the acid acceptor is preferably at least one selected from the group consisting of high-activity magnesium oxide and low-activity magnesium.

Polyamine crosslinking can be carried out by using a fluorine-containing elastomer capable of polyamine crosslinking as a fluorine-containing elastomer and a polyamine compound as a cross-linking agent.

The fluorine-containing elastomer capable of polyamine crosslinking is not limited, and is a fluorine-containing elastomer having a site capable of polyamine crosslinking. The site capable of polyamine crosslinking is not limited, and may be, for example, a site having a vinylidene fluoride (VdF) unit. The method for introducing the crosslinking site may be a method involving copolymerizing a monomer that provides a crosslinking site at the time of polymerization of a fluorine-containing elastomer.

Examples of the polyamine compound include hexamethylenediamine carbamate, N,N'-dicinnamylidene-1,6-hexamethylenediamine, and 4,4'-bis(aminocyclohexyl)methane carbamate. Among these, N,N'-dicinnamylidene-1,6-hexamethylenediamine is preferable.

The fluorine-containing elastomer composition may contain at least one polyfunctional compound. The polyfunctional compound is a compound having two or more functional groups having the same or different structures within one molecule. The functional group contained in the polyfunctional compound may be a functional group generally known to have reactivity, such as a carbonyl group, a carboxyl group, a haloformyl group, an amide group, an olefin group, an amino group, an isocyanate group, a hydroxy group, and an epoxy group.

The fluorine-containing elastomer composition may contain an ordinary additive that is added to an elastomer as necessary, such as a filler, a processing aid, a plasticizer, a colorant, a stabilizer, an adhesive aid, a mold release agent, an electroconductivity imparting agent, a thermal conductivity imparting agent, a surface non-sticking agent, a flexibility imparting agent, a heat resistance improving agent, a flame retarder, and like various additives, and such additives are used as long as the effects of the present disclosure are not impaired.

The molded article can be obtained from the fluorine-containing elastomer composition. The molded article can be obtained by molding and crosslinking the fluorine-containing elastomer composition. The fluorine-containing elastomer composition can be molded by a conventionally known method. The molding and crosslinking methods and conditions are within the scope of known methods and conditions for the adopted molding and crosslinking. The order of molding and crosslinking is not limited, and the composition may be molded and then crosslinked, may be crosslinked and then molded, or simultaneously molded and crosslinked.

Examples of the molding method include, but are not limited to, a pressure molding method and an injection molding method involving a metal mold or the like. The crosslinking method adopted may be a steam crosslinking method, an ordinary method in which the crosslinking reaction is started by heating, a radiation crosslinking method, or the like, and, in particular, the crosslinking reaction by heating is preferable. Non-limiting specific crosslinking conditions are suitably determined according to the type of a crosslinking agent to be used, usually within a temperature range of 140 to 250° C. and a crosslinking time of 1 min to 24 hr.

The resulting molded article can be used as various components in various fields such as automobile industry, aircraft industry, and semiconductor industry. The molded article can be used in the same applications as the cross-linked rubber molded articles described in Japanese Patent Laid-Open No. 2013-216915 and the fluoroelastomer molded articles described in Japanese Patent Laid-Open No. 2019-94430, such as sealing materials, sliding members, and non-stick members.

Examples of the usage of the molded article include various sealing materials and packings, such as rings, packings, gaskets, diaphragms, oil seals, and bearing seals. The molded article as a sealing material can be used in applications where excellent non-stickiness and low-friction properties are required. In particular, the molded article can be suitably used in various sealing materials in the automobile industry and the like.

Also, the molded article can be used as a tube, a hose, a roll, various types of rubber roll, a flexible joint, a rubber plate, a coating, a belt, a damper, a valve, a valve seat, a valve body, a chemical resistant coating material, a laminating material, a lining material, and the like.

While embodiments have been described above, it will be understood that various changes in form and detail can be made without departing from the gist and scope of the claims.

The present disclosure provides a method for producing an aqueous dispersion of a fluorine-containing elastomer, comprising polymerizing a fluorine-containing monomer in the presence of a compound (1) having a triple bond and a hydrophilic group and an aqueous medium to produce an aqueous dispersion of a fluorine-containing elastomer:

The compound (1) is preferably a compound (1) represented by general formula (1):

$$A^1\text{-}R^1—C{\equiv}CX^1 \qquad \text{General formula (1):}$$

wherein $A^1$ is —COOM, —$SO_3M$, —$OSO_3M$, —B(OM)($OR^2$), —OB(OM)($OR^2$), —PO(OM)($OR^2$), or —OPO(OM)($OR^2$); M is H, a metal atom, $NR^3_4$, optionally substituted imidazolium, optionally substituted pyridinium, or optionally substituted phosphonium; $R^3$ is the same or different at each occurrence and is H or an organic group; $R^2$ is H, a metal atom, $NR^3_4$, optionally substituted imidazolium, optionally substituted pyridinium, optionally substituted phosphonium, or an alkynyl group; $R^1$ is single bond or a divalent hydrocarbon group optionally having a halogen atom; and $X^1$ is H, $A^1$, or a hydrocarbon group optionally having a halogen atom, an ether bond, an ester bond, or an amide bond.

$A^1$ in general formula (1) is preferably —COOM, wherein M is as described above.

The compound (1) is preferably a fluorine-free compound.

The amount of the compound (1) is preferably 3 to 5,000 mass ppm based on the aqueous medium.

After the compound (1) is added, polymerization of the fluorine-containing monomer is preferably initiated by adding a polymerization initiator.

The fluorine-containing monomer is preferably vinylidene fluoride or tetrafluoroethylene.

The fluorine-containing monomer is preferably vinylidene fluoride.

The fluorine-containing monomer is preferably polymerized also in the presence of a fluorine-containing compound (A) represented by general formula (A):

$$CX^iX^k{=}CX^jR^a—(CZ^1Z^2)_k—Y^3 \qquad \text{General formula (A):}$$

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1; provided that at least one of $X^i$, $X^k$, $X^j$, $R^a$, $Z^1$, and $Z^2$ comprises F; and provided that when k is 0, $R^a$ is a linking group other than single bond.

The fluorine-containing monomer is preferably polymerized also in the presence of a chain transfer agent.

The fluorine-containing monomer is preferably polymerized at 10 to 120° C.

The fluorine-containing monomer is preferably polymerized at 0.5 to 10 MPaG.

The fluorine-containing elastomer preferably contains —$CH_2$— in a main chain.

The fluorine-containing elastomer preferably has a Mooney viscosity (ML1+10 (100° C.)) of 10 to 130.

The fluorine-containing elastomer preferably has an average particle size of 500 nm or less.

Also, the present disclosure provides a fluorine-containing elastomer comprising a monomer unit based on a compound having a triple bond and an anionic hydrophilic group.

Further, the present disclosure provides an aqueous dispersion comprising the fluorine-containing elastomer and an aqueous medium.

EXAMPLES

Next, embodiments of the present disclosure will now be described by way of Examples, but the present disclosure is not limited only to the Examples.

Various numerical values in the Examples were measured by the following methods.

Solid Concentration of Aqueous Dispersion

One gram of an aqueous dispersion was dried in an air dryer under 150° C. and 180-minute conditions, and the mass of the heating residue was measured to determine the proportion (mass %) of the mass of the heating residue to the mass (1 g) of the aqueous dispersion.

Polymer Adhesion Rate

The ratio (adhesion rate to a polymerization tank) of the mass of polymer deposits adhering to the polymerization tank after completion of polymerization to the total amount of a polymer (fluorine-containing elastomer) after completion of polymerization was determined by the following formula.

Polymer adhesion rate (mass %)=Mass of polymer deposits/Mass of resulting polymer (including polymer deposits)×100

Mass of resulting polymer=Mass of aqueous dispersion×Solid concentration (mass %) of aqueous dispersion/100+Mass of polymer deposits Polymer deposits include a polymer adhering to the inside of the polymerization tank such as the inner wall of the polymerization tank and a stirring blade after an aqueous dispersion is removed from the polymerization tank after completion of polymerization, and a polymer that is freed from the aqueous dispersion due to aggregation and is floating or precipitated without being dispersed in the aqueous dispersion. The mass of polymer deposits is the mass after water contained in the polymer deposits is dried and removed at 120° C.

Average Particle Size

As for the average particle size (the cumulant average diameter) of fluorine-containing elastomer particles in an aqueous dispersion, measurement was carried out by dynamic light scattering using ELSZ-1000S (manufactured by Otsuka Electronics Co., Ltd.), and the average particle size was calculated by a cumulant method.

Number of Particles (Number of Fluorine-Containing Elastomer Particles in Aqueous Dispersion)

The number of particles was calculated by the following expression:

$$\text{Number of polymer particles} = \left\{\frac{\text{Solid concentration of aqueous dispersion (mass \%)}}{100 - \text{Solid conentration of aqueous dispersion (mass \%)}}\right\} \Big/ \left\{\frac{4}{3}\times 3.14\times\left(\frac{\text{Average particle size (nm)}}{2}\times 10^{-9}\right)^3\times\text{Specific gravity}\times 10^6\right\}$$

wherein the average particle size is a cumulant average size as calculated by the method described above, and the number of polymer particles (the number of fluorine-containing elastomer particles) is the number of particles per 1 cc of water, with the specific density of all fluorine-containing elastomers in the Examples and Comparative Examples being 1.8.

Mooney Viscosity

The Mooney viscosity was measured at 100° C. in accordance with JIS K 6300-1.2013 using a Mooney viscometer MV 2000E manufactured by ALPHA TECHNOLOGIES.

Copolymerization Composition

The copolymerization composition was determined by NMR analysis.

Example 1

First, 1,500 g of deionized water, 0.075 g of monopotassium acetylenedicarboxylate, and 0.150 g of a 50 mass % aqueous solution of $CH_2{=}CF{-}CF_2OCF(CF_3)CF_2OCF(CF_3)COONH_4$ were added to an SUS polymerization tank having an internal volume of 3 L, the polymerization tank was hermetically sealed, and the system was purged with nitrogen to remove oxygen. The polymerization tank was heated to 80° C., and VdF, TFE, and HFP (initial monomers) were introduced under pressure so as to attain a molar ratio of vinylidene fluoride [VdF]/tetrafluoroethylene [TFE]/hexafluoropropylene [HFP](=19/11/70 mol %) and an inner pressure of the polymerization tank of 2.03 MPaG while being stirred.

Then, an aqueous polymerization initiator solution obtained by dissolving 0.09 g of ammonium persulfate (APS) in deionized water was introduced under pressure of nitrogen gas to start a reaction. When the internal pressure dropped to 2.00 MPaG as the polymerization progressed, a mixed monomer of VdF/TFE/HFP (=50/20/30 mol %) was introduced such that the internal pressure was constant at 2.03 MPaG.

When 10 g of the mixed monomer was added, 2.45 g of diiodine compound $I(CF_2)_4I$ was introduced under pressure of nitrogen gas.

An aqueous solution of a polymerization initiator containing 0.06 g of APS at 3.0 hours, 0.03 g of APS at 4.0 hours and 0.06 g of APS at 6.0 hours after the initiation of polymerization was introduced under pressure of nitrogen gas.

When 500 g of the mixed monomer was added, stirring was stopped, and depressurization was carried out until the polymerization tank reached atmospheric pressure. The polymerization tank was cooled to give an aqueous dispersion. Table 1 shows the polymer adhesion rate, the solid concentration of the aqueous dispersion, the mass of the aqueous dispersion, the average particle size, and the number of particles.

An aqueous aluminum sulfate solution was added to the aqueous dispersion to carry out coagulation. The resulting coagulated product was washed with water and dried to give a fluorine-containing elastomer. The Mooney viscosity of the fluorine-containing elastomer was ML1+10 (100° C.)=46.8. The copolymer composition examined by NMR analysis was VdF/TFE/HFP=54/20/26 (mol %).

Example 2

First, 1,500 g of deionized water and 0.075 g of monopotassium acetylenedicarboxylate were added to an SUS polymerization tank having an internal volume of 3 L, the polymerization tank was hermetically sealed, and the system was purged with nitrogen to remove oxygen. The polymerization tank was heated to 80° C., and VdF and HFP (initial monomers) were introduced under pressure so as to attain a molar ratio of vinylidene fluoride [VdF]/hexafluoropropylene [HFP] (=50/50 mol %) and an inner pressure of the polymerization tank of 2.00 MPaG while being stirred.

Then, an aqueous polymerization initiator solution obtained by dissolving 0.072 g of ammonium persulfate (APS) in deionized water was introduced under pressure of nitrogen gas. When the internal pressure dropped to 1.98 MPaG as the polymerization progressed, a mixed monomer of VDF/HFP (=78/22 mol %) was introduced such that the internal pressure was constant at 2.00 MPaG.

When 10 g of the mixed monomer was added, 2.16 g of diiodine compound $I(CF_2)_4I$ was introduced under pressure of nitrogen gas.

Each time at 3.0 hours, 6.0 hours, and 9.0 hours after the initiation of polymerization, 0.072 g of an aqueous polymerization initiator solution of APS was introduced under pressure of nitrogen gas.

When 500 g of the mixed monomer was added, stirring was stopped, and depressurization was carried out until the polymerization tank reached atmospheric pressure. The polymerization tank was cooled to give an aqueous dispersion. Table 1 shows the polymer adhesion rate, the solid concentration of the aqueous dispersion, the mass of the aqueous dispersion, the average particle size, and the number of particles.

An aqueous aluminum sulfate solution was added to the aqueous dispersion to carry out coagulation. The resulting coagulated product was washed with water and dried to give a fluorine-containing elastomer. The Mooney viscosity of the fluorine-containing elastomer was ML1+10 (100° C.)=46.8. The copolymer composition examined by NMR analysis was VdF/HFP=79/21 (mol %).

Example 3

Polymerization was performed in the same manner as in Example 2, except that 0.075 g of ammonium propiolate was added before the initiation of polymerization instead of 0.075 g of monopotassium acetylenedicarboxylate.

The polymerization tank was cooled to give an aqueous dispersion. Table 1 shows the polymer adhesion rate, the solid concentration of the aqueous dispersion, the mass of the aqueous dispersion, the average particle size, and the number of particles.

An aqueous aluminum sulfate solution was added to the aqueous dispersion to carry out coagulation. The resulting coagulated product was washed with water and dried to give a fluorine-containing elastomer. The Mooney viscosity of the fluorine-containing elastomer was ML1+10 (100° C.)=56.7. The copolymer composition examined by NMR analysis was VdF/HFP=79/21 (mol %).

[Table 1]

TABLE 1

| | | Example 1 | Example 2 | Example 3 |
|---|---|---|---|---|
| Compound (1) | | Monopotassium acetylenedicarboxylate | Monopotassium acetylenedicarboxylate | Ammonium propiolate |
| Fluorine-containing compound (A) | | $CH_2{=}CF{-}CF_2OCF(CF_3)CF_2OCF(CF_3)COONH_4$ | None | None |
| Reaction time | min. | 492 | 616 | 716 |
| Polymer adhesion rate | mass % | 0.03 | 1.10 | 0.60 |
| Solid concentration | mass % | 23.3 | 24.6 | 24.7 |
| Mass of aqueous dispersion | g | 2003 | 1963 | 1966 |
| Average particle size | nm | 127 | 215 | 177 |
| Number of particles | particles/cc | $1.58 \times 10^{14}$ | $3.45 \times 10^{13}$ | $6.26 \times 10^{13}$ |

Crosslinking Characteristics

The fluorine-containing elastomers obtained in Examples 1 to 3 were kneaded to have the formulations shown in Table 2 to give fluorine-containing elastomer compositions. Concerning the resulting fluorine-containing elastomer compositions, a crosslinking curve was determined using a rubber vulcanization tester MDRH2030 (manufactured by M&K Co., Ltd.) at the time of press crosslinking, and the minimum viscosity (ML), the maximum torque level (MH), the induction time (T10), and the optimum vulcanization time (T90) were determined. Further, the fluorine-containing elastomer compositions were crosslinked by press crosslinking and oven crosslinking following the press crosslinking to give crosslinked molded article sheets.

Kneading method: Roll kneading

Press crosslinking: 160° C. for 10 minutes

Oven crosslinking: 180° C. for 4 hours

Materials shown in Table 2 are as follows.

MT carbon: Thermax N-990 manufactured by Cancarb Limited

TAIC: Triallyl isocyanurate, TAIC, manufactured by Nihon Kasei CO., LTD

Perhexa 25B: 2,5-Dimethyl-2,5-di(t-butylperoxy)hexane, manufactured by NOF CORPORATION Ordinary-State Properties Using the crosslinked molded article sheets, test pieces having a dumbbell No. 6 shape were prepared in accordance with JIS K 6251, and the 100% modulus (M100), the tensile strength at break (TB), and the elongation at break (EB) of the prepared test pieces in ordinary state were measured.

Hardness

A test piece having a dumbbell No. 6 shape was prepared in the same manner as above, and the hardness (Shore A) of the prepared test piece was measured in accordance with JIS K 6253 (a peak value, 1 sec, 3 sec).

Compression Set

Using the fluorine-containing elastomer compositions, press crosslinking and oven crosslinking were carried out under the above conditions to prepare 0 rings (P-24 size), and the compression set of the prepared 0 rings was measured in accordance with JIS K 6262 under conditions of 200° C., 72 hours, and 25% compression.

Heat Aging Test

A test piece having a dumbbell No. 6 shape was prepared using a crosslinked molded article sheet. After the test piece was heat-treated at 250° C. for 72 hours, the 100% modulus (M100), the tensile strength at break (TB), the elongation at break (EB), and the hardness of the heat-treated test piece were measured by the methods described above. Table 2 shows the rate of change in M100, TB, and EB of the heat-treated test piece relative to the measured values of ordinary-state properties. Table 2 also shows the difference between the hardness (Shore A change) of the test piece before and after the heat treatment.

The results of the above measurements are shown in Table 2.

TABLE 2

| | | | Example 1 | Example 2 | Example 3 |
|---|---|---|---|---|---|
| Formulation | Fluorine-containing elastomer | phr | 100 | 100 | 100 |
| | MT carbon | phr | 20 | 20 | 20 |
| | TAIC | phr | 4 | 4 | 4 |
| | Perhexa 25B | phr | 1.5 | 1.5 | 1.5 |
| Crosslinking characteristics 160° C. | ML | dNm | 0.7 | 0.6 | 0.7 |
| | MH | dNm | 24.8 | 17.3 | 16.5 |
| | T10 | min | 1.2 | 1.2 | 1.3 |
| | T90 | min | 3.6 | 5.2 | 5.3 |
| Crosslinking conditions | Press crosslinking | | 160° C. × 10 min | 160° C. × 10 min | 160° C. × 10 min |
| | Oven crosslinking | | 180° C. × 4 h | 180° C. × 4 h | 180° C. × 4 h |
| Ordinary-state properties | M100 | MPa | 3.4 | 2.0 | 2.0 |
| | TB | MPa | 25.4 | 26.6 | 27.4 |
| | EB | % | 310 | 458 | 482 |
| Hardness | ShoreA peak | point | 69 | 64 | 64 |
| | ShoreA 1 sec | point | 66 | 61 | 61 |
| | ShoreA 3 sec | point | 65 | 60 | 60 |
| Compression set | | % | 25 | 32 | 35 |
| Heat aging test 250° C. × 72 h | M100 rate of change | % | −31 | — | −16 |
| | TB rate of change | % | −64 | — | −54 |
| | EB rate of change | % | 77 | — | 11 |

TABLE 2-continued

| | | Example 1 | Example 2 | Example 3 |
|---|---|---|---|---|
| Shore A change peak | point | 1.0 | — | −0.1 |
| Shore A change 1sec | point | 0.5 | — | −0.6 |
| Shore A change 3sec | point | −0.4 | — | −1.3 |

The invention claimed is:

1. A method for producing an aqueous dispersion of a fluorine-containing elastomer, comprising polymerizing a fluorine-containing monomer in the presence of a compound (1) having a triple bond and a hydrophilic group and an aqueous medium to produce an aqueous dispersion of a fluorine-containing elastomer.

2. The production method according to claim 1, wherein the compound (1) is a compound (1) represented by general formula (1):

$A^1$-$R^1$-C≡$CX^1$ General formula (1)

wherein $A^1$ is —COOM, —$SO_3M$, —$OSO_3M$, —B(OM)($OR^2$), —OB(OM)($OR^2$), —PO(OM)($OR^2$), or —OPO(OM)($OR^2$);

M is H, a metal atom, $NR^3_4$, optionally substituted imidazolium, optionally substituted pyridinium, or optionally substituted phosphonium;

$R^3$ is the same or different at each occurrence and is H or an organic group;

$R^2$ is H, a metal atom, $NR^3_4$, optionally substituted imidazolium, optionally substituted pyridinium, optionally substituted phosphonium, or an alkynyl group;

$R^1$ is single bond or a divalent hydrocarbon group optionally having a halogen atom; and $X^1$ is H, $A^1$, or a hydrocarbon group optionally having a halogen atom, an ether bond, an ester bond, or an amide bond.

3. The production method according to claim 2, wherein $A^1$ in general formula (1) is-COOM, wherein M is as described above.

4. The production method according to claim 1, wherein the compound (1) is a fluorine-free compound.

5. The production method according to claim 1, wherein an amount of the compound (1) is 3 to 5,000 mass ppm based on the aqueous medium.

6. The production method according to claim 1, wherein after the compound (1) is added, polymerization of the fluorine-containing monomer is initiated by adding a polymerization initiator.

7. The production method according to claim 1, wherein the fluorine-containing monomer is vinylidene fluoride or tetrafluoroethylene.

8. The production method according to claim 1, wherein the fluorine-containing monomer is vinylidene fluoride.

9. The production method according to claim 1, wherein the fluorine-containing monomer is polymerized also in the presence of a fluorine-containing compound (A) represented by general formula (A):

$CX^iX^k{=}CX^jR^a\text{-}(CZ^1Z^2)_k\text{-}Y^3$ General formula (A)

wherein $X^i$, $X^j$, and $X^k$ are each independently F, Cl, H, or $CF_3$;

$Y^3$ is a hydrophilic group;

$R^a$ is a linking group;

$Z^1$ and $Z^2$ are each independently H, F, or $CF_3$; and k is 0 or 1;

provided that at least one of $X^i$, $X^k$, $X^j$, $R^a$, $Z^1$, and $Z^2$ comprises F; and provided that when k is 0, $R^a$ is a linking group other than single bond.

10. The production method according to claim 1, wherein the fluorine-containing monomer is polymerized also in the presence of a chain transfer agent.

11. The production method according to claim 1, wherein the fluorine-containing monomer is polymerized at 10 to 120° C.

12. The production method according to claim 1, wherein the fluorine-containing monomer is polymerized at 0.5 to 10 MPaG.

13. The production method according to claim 1, wherein the fluorine-containing elastomer comprises —$CH_2$— in a main chain.

14. The production method according to claim 1, wherein the fluorine-containing elastomer has a Mooney viscosity (ML1+10 (100° C.)) of 10 to 130.

15. The production method according to claim 1, wherein the fluorine-containing elastomer has an average particle size of 500 nm or less.

16. A fluorine-containing elastomer comprising a monomer unit based on a compound (1) having a triple bond and an anionic hydrophilic group.

17. An aqueous dispersion comprising the fluorine-containing elastomer according to claim 16 and an aqueous medium.

18. The production method according to claim 1, wherein the hydrophilic group of the compound (1) includes an anionic hydrophilic group.

* * * * *